US011632685B2

(12) United States Patent
Tseng et al.

(10) Patent No.: US 11,632,685 B2
(45) Date of Patent: Apr. 18, 2023

(54) METHOD AND APPARATUS FOR HANDLING MEASUREMENT IN WIRELESS COMMUNICATION SYSTEM

(71) Applicant: FG Innovation Company Limited, Tuen Mun (HK)

(72) Inventors: Yung-Lan Tseng, Hsinchu (TW); Mei-Ju Shih, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 190 days.

(21) Appl. No.: 16/903,216

(22) Filed: Jun. 16, 2020

(65) Prior Publication Data

US 2020/0396633 A1 Dec. 17, 2020

Related U.S. Application Data

(60) Provisional application No. 62/862,228, filed on Jun. 17, 2019.

(51) Int. Cl.
*H04W 4/00* (2018.01)
*H04W 24/10* (2009.01)
(Continued)

(52) U.S. Cl.
CPC .......... *H04W 24/10* (2013.01); *H04L 5/0094* (2013.01); *H04W 72/0453* (2013.01); *H04W 74/0833* (2013.01); *H04W 76/27* (2018.02)

(58) Field of Classification Search
CPC ............ H04W 24/10; H04W 72/0453; H04W 74/0833; H04W 76/27; H04W 48/12; H04L 5/0094; H04L 5/001
(Continued)

(56) References Cited

U.S. PATENT DOCUMENTS 11,076,330 B2 * 7/2021 Venkataraman ...... H04W 76/27
2013/0072182 A1 3/2013 Jung et al.
(Continued)

FOREIGN PATENT DOCUMENTS

WO 2018201731 A1 11/2018
WO WO-2021152365 A1 * 8/2021

OTHER PUBLICATIONS

Ericsson; "Handling of early measurement configurations and results during autonomous transition to IDLE"; 3GPP TSG-RAN WG2#106; Reno, Nevada, USA, May 13-17, 2019; R2-1907246; May 3, 2019(May 3, 2019); sections 2-3.
(Continued)

*Primary Examiner* — Thai D Hoang
(74) *Attorney, Agent, or Firm* — ScienBiziP, P.C.

(57) ABSTRACT

A method and an apparatus for handling measurement operations in a wireless communication system are provided. The method includes a UE receiving a first measurement configuration in system information from a first serving cell. The first measurement configuration indicates at least one first cell applicable for being measured by the UE in a first Radio Resource Control (RRC) state which is an RRC idle state or an RRC inactive state. The method further includes the UE performing, in the first RRC state, a first measurement operation based on the first measurement configuration to generate a first measurement result of the at least one first cell and retaining the first measurement result when the UE transitions from the first RRC state to a second RRC state.

28 Claims, 13 Drawing Sheets

(51) Int. Cl.
*H04W 76/27* (2018.01)
*H04W 72/0453* (2023.01)
*H04W 74/08* (2009.01)
*H04L 5/00* (2006.01)

(58) Field of Classification Search
USPC .............. 370/329–330, 335–345, 348–348
See application file for complete search history.

(56) References Cited

U.S. PATENT DOCUMENTS

| | | |
|---|---|---|
| 2017/0367125 A1* | 12/2017 | Krishnamoorthy ... H04W 76/10 |
| 2018/0152865 A1* | 5/2018 | Atri ................... H04W 36/0022 |
| 2018/0270682 A1* | 9/2018 | Zacharias ............. H04W 24/10 |
| 2019/0037425 A1 | 1/2019 | Hong et al. |
| 2020/0107230 A1* | 4/2020 | Zhao ..................... H04W 76/11 |

OTHER PUBLICATIONS

3GPP TS 38.331, "3rd Generation Partnership Project; Technical Specification Group Radio Access Network; NR; Radio Resource Control (RRC) protocol specification (Release 15)", Technical Specification, V15.5.1 (Apr. 2019).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, V15.5.1 (Apr. 2019).

* cited by examiner

METHOD AND APPARATUS FOR HANDLING MEASUREMENT IN WIRELESS COMMUNICATION SYSTEM

CROSS-REFERENCE TO RELATED APPLICATION(S)

The present disclosure claims the benefit of and priority to provisional U.S. Patent Application Ser. No. 62/862,228 ("the '228 provisional"), filed on Jun. 17, 2019, entitled "MEASUREMENT REPORT THROUGH 2-STEP RANDOM ACCESS PROCEDURE." The contents of the '228 provisional are fully incorporated herein by reference for all purposes.

FIELD

The present disclosure generally relates to wireless communications, and more particularly, to methods and apparatuses for handling measurement in a wireless communication system.

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is directed to methods and apparatuses for handling measurement in a wireless communication system.

According to an aspect of the present disclosure, a method performed by a User Equipment (UE) is provided. The method includes a UE receiving a first measurement configuration in system information from a first serving cell. The first measurement configuration indicates at least one first cell applicable for being measured by the UE in a first Radio Resource Control (RRC) state which is an RRC idle state or an RRC inactive state. The method further includes the UE performing, in the first RRC state, a first measurement operation based on the first measurement configuration to generate a first measurement result of the at least one first cell and retaining the first measurement result when the UE transitions from the first RRC state to a second RRC state (e.g., the UE may retain the first measurement result during and after the RRC state transition from the first RRC state to the second RRC state).

According to another aspect of the present disclosure, a UE is provided. The UE includes a memory and at least one processor coupled to the memory. The at least one processor is configured to receive a first measurement configuration in system information from a first serving cell. The first measurement configuration indicates at least one first cell applicable for being measured by the UE in a first RRC state which is an RRC idle state or an RRC inactive state. The at least one processor is further configured to perform, in the first RRC state, a first measurement operation based on the first measurement configuration to generate a first measurement result of the at least one first cell and retain the first measurement result during (and after) the RRC state transition (e.g., when the UE transitions from the first RRC state to a second RRC state). In some implementations, the target component carriers of first measurement configuration may include any combinations of frequency component carriers on licensed bands and un-licensed bands. In addition, the measurement configuration may also include the target cells, which may operate on licensed bands and un-licensed bands, as the objectives for UE measurements.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
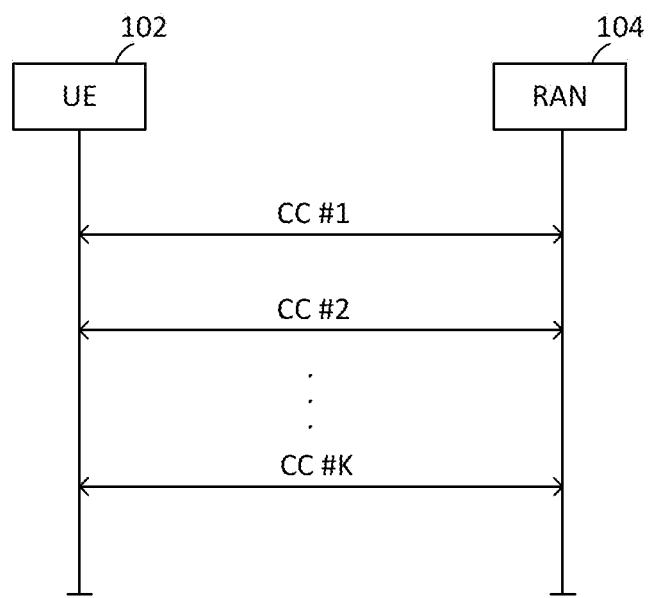
FIG. 1 is a diagram illustrating a UE configured with several Component Carrier (CC)s with multiple active Bandwidth Parts (BWPs) in each CC, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may differ in other respects, and thus shall not be narrowly confined to what is shown in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, or an LTE-Advanced Pro system) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA (Evolved Universal Terrestrial Radio Access) BS in connection with the 5GC, a next generation Node B (gNB) as in the 5G Radio Access Network (5G-RAN), and any other apparatus capable of controlling radio communication and managing radio resources within a cell. The BS may serve one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present disclosure should not be limited to the above mentioned protocols.

The BS may be operable to provide radio coverage to a specific geographical area using a plurality of cells being included the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe) or Vehicle-to-Everything (V2X) services or NR sidelink services. Each cell may have overlapped coverage areas with other cells. In MR-DC cases, the PCell of an MCG or the Primary Secondary cell (PSCell) of an SCG may be called as a Special Cell (SpCell). PCell may refer to the SpCell of an MCG. A Primary Secondary Cell (PSCell) may refer to the SpCell of an SCG. MCG means a group of serving cells associated with the Master Node (MN) or the Master Base Station, comprising of the SpCell and optionally one or more Secondary Cells (SCells). SCG means a group of serving cells associated with the Secondary Node (SN) or the Secondary Base Station, comprising of the SpCell and optionally one or more SCells.

As discussed above, the frame structure for NR is to support flexible configurations for accommodating various next generation (e.g., 5G) communication requirements, such as eMBB, mMTC and URLLC, while fulfilling high reliability, high data rate and low latency requirements. The orthogonal frequency-division multiplexing (OFDM) technology as agreed in 3rd Generation Partnership Project (3GPP) may serve as a baseline for NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, a DL transmission data, a guard period, and an UL transmission data should at least be included, where the respective portions of the DL transmission data, the guard period, the UL transmission data should also be configurable, for example, based on the network dynamics of NR. In addition, sidelink resource may also be provided in an NR frame to support ProSe services or Vehicle-to-Everything (V2X) services or NR sidelink services.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

In the NR protocols, the 2-step Random Access (RA) procedure may be considered to be used to facilitate the access of stand-alone NR-U scenario. In addition, for the NR-U operation, a gNB may need assistance information (e.g., NR-U measurement result, such as the Received Signal Strength Indication (RSSI) measurement/Reference Signal Received Power (RSRP) measurement/Reference Signal Received Quality (RSRQ) measurement/Signal to Interference plus Noise Ratio (SINR) measurement and the Channel Occupancy (CO) measurement of at least one unlicensed frequency carrier) to configure the appropriate NR-U radio resource(s) based on a given Received Signal Strength Indication (RSSI)-threshold/RSRP-threshold/RSRQ-threshold/SINR-threshold (e.g., being provided within the measurement configuration or Early measurement configuration). One of the reasons is that a hidden node that is nearby the UE may interfere the NR-U packet receptions at the UE. The gNB may need the UE's measurement report (e.g., the RSSI/RSRP/RSRQ/SINR & CO measurement observed by the UE) to determine the NR-U radio resource assigned to the UE (since the serving RAN may not detect the hidden node by itself alone). Moreover, a fast reporting approach to the RSRP/RSRQ/RSSI/SINR & CO measurement report of the NR-U standalone SpCell(s) may be critical to maintain the air link quality when the SpCell is operating as an NR-U standalone cell. In addition, a UE may need to provide an NR-U measurement report (continuously/aperiodically) to reflect the varying channel quality. Therefore, a fast and efficient (from the perspective of PHY resource or time consumption) measurement reporting mechanism may be necessary for operations on licensed or unlicensed bands. In addition, it may be also beneficial for the RAN to dynamically configure an NR-U carrier to adapt the fast-changing unlicensed bands. Besides, NR-U carrier, the same solution may also applicable to RAN/UEs operating on licensed bands.

FIG. 1 is a diagram illustrating a UE configured with several CCs with multiple active BWPs in each CC, in accordance with an implementation of the present disclosure. Each CC or BWP may be operating on the licensed or unlicensed bands. For example, a CC or BWP operating on the unlicensed bands may be referred to as an NR-U CC or NR-U BWP; a CC or BWP operating on the licensed bands may be referred to as an NR CC or NR BWP.

Referring to FIG. 1, the UE 102 may be configured with one or more than one serving cells (e.g., NR-U cells or NR cells operating on licensed bands) by the serving RAN 104. Each serving cell is operating on one operating component carrier (e.g., among the CC#1~CC#K). For each serving cell, the UE 102 may be further configured with one or more than one active Bandwidth Part (BWP). Thus, the serving RAN 104 may need the UE to provide the RSSI/RSRP/RSRQ/SINR measurement and/or the CO measurement to the serving RAN in an efficient way. Additionally, the RAN 104 may include one or more than one BS (e.g., an NR gNB or an LTE eNB). Each BS may broadcast one or more than one cell Identity (ID), such as a Physical Cell ID (PCI) or cellidentiy in the Physical Broadcasting Channel (PBCH), which may be used to identify a unique cell in a Public Land Mobile Network (PLMN) or Non-Public Network (NPN). As shown in FIG. 1, the cell(s) may be operating on the CC#1 to the CC #K, where K is a positive integer. The UE 102 may identify each cell by monitoring the cell IDs delivered through the physical channels.

In some implementations, a UE may transmit a measurement report (e.g., an NR-U measurement report) to the serving BS (e.g., the gNB or the eNB) through a 2-step RA procedure.

Figure 2:
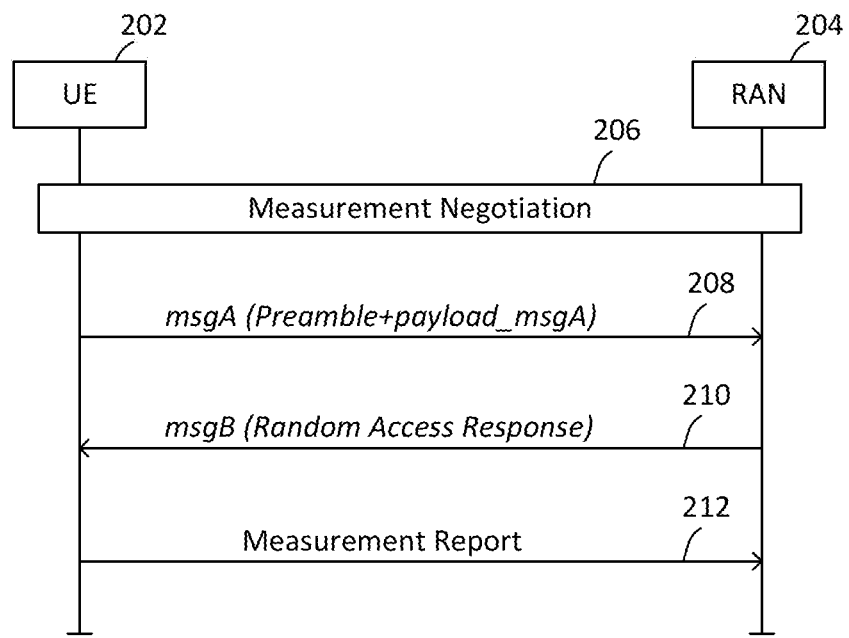
FIG. 2 illustrates a signaling flow of carrier management through a 2-step Random Access (RA) procedure, in accordance with an implementation of the present disclosure.

FIG. 2 illustrates a signaling flow of carrier management through a 2-step RA procedure, in accordance with an implementation of the present disclosure.

As shown in FIG. 2, in action 206, the UE 202 may perform the measurement negotiation with the serving RAN 204 (or serving cell). In some implementations, the UE 202 may receive the measurement configuration by receiving the broadcasting system information or the UE-specific control signaling (e.g., RRCRelease message) from the serving RAN 204.

In action 208, the UE 202 may provide a first message (msgA), which may include a preamble and a payload of the msgA, to the RAN 204. In some implementations, the payload of the msgA may include at least one of the following: 1) a measurement report (e.g., an (NR-U/NR) measurement report), 2) an indication indicating that the measurement report is available, and 3) a UL Buffer Status Report (BSR). In some implementations, the preamble part of the msgA may be transmitted on a Physical Random Access Channel (PRACH) and the payload of the msgA may be transmitted on a Physical Uplink Shared Channel (PUSCH).

In action 210, after receiving the msgA, the RAN 204 (e.g., the serving cell of the UE) may reply to the UE 202 with a second message (msgB). In some implementations, the msgB may include at least one of the following: 1) a Random Access Response (RAR) message and 2) a dedicated control signaling (e.g., the Radio Resource Control (RRC) signaling, such as the RRC setup message (RRCSetup or RRCConnectionSetup), the RRC resume message (RRCResume or RRCConnectionResume), the RRC release message (RRCRelease or RRCConnectionRelease), the RRC re-establishment message (RRCReestablishment or RRCConnectionReestablishment), or the RRC connection reconfiguration message (RRCReconfiguration or RRCConnectionReconfiguration). It is noted that relative to broadcast signaling, dedicated (control) signaling may refer to the signaling that is sent by a BS to one or more specific objects (e.g., UE(s)). In some implementations, the RAN 204 (or serving cell of the UE) may re-configure the NR/NR-U radio resource (e.g., the information of NR/NR-U cell activation/de-activation, the NR/NR-U BWP configuration, the UL configured grant configuration, the DL-SPS configuration) in the payload of the msgB if the measurement report is provided in msgA. In some implementations, a part of the msgB may be transmitted by the Downlink Control Information (DCI) in a Physical Downlink Control Channel (PDCCH) and another part of the msgB may be transmitted in a Physical Downlink Shared Channel (PDSCH), where the location of the Resource Blocks (RBs) in the PDSCH may be configured by the DCI in the msgB. In some implementations, the msgB may be transmitted in a PDCCH only (e.g., the DCI that includes the whole msgB may be transmitted in the PDCCH).

In some implementations, the RAN 204 (or serving cell) may provide an UL grant in the msgB. The UE 202 may also provide a measurement report (e.g., an measurement report) on the given UL grant. In some implementations, there may be a report indicator provided in the msgB to indicate to the UE 202 to provide a measurement report. In some implementations, the RAN 204 (or serving cell) may provide the UL grant by referring to an UL-BSR in the msgA.

In some implementations, a UE may deliver a part of the measurement report (e.g., the RSSI and CO measurements on the SpCell, which may be more critical to the serving RAN) in the msgA. The UE may also further indicate that the remaining part of the measurement report is available in the msgA. After receiving the msgA, the serving RAN (or serving cell) may further provide a UL grant in the msgB for the UE to transmit the remaining part of the measurement report.

In some implementations, after receiving the msgA, the serving cell may provide the feedback information to a UE via the msgB. In some implementations, various formats of the msgB may be applied to reply the UE. In some implementations, a serving cell may just provide an Acknowledgment (ACK)/Negative-Acknowledgment (NACK) message in the msgB as the feedback of the msgA reception. In some implementations, a serving RAN (e.g., a serving cell) may further re-configure the (NR-U) radio resource in the msgB to the UE (e.g., via the RRC signaling, such as the RRCConnectionReconfiguration message). In some implementations, a serving cell may or may not configure a periodic Physical Uplink Control Channel (PUCCH) radio resource for a Scheduling Request (SR) on the (NR-U) carrier(s) for requesting the UL grants to transmit the (NR-U) measurement report.

In some implementations, a UE may perform measurements when operating in an (NR/LTE) RRC inactive state or an (NR/LTE) RRC idle state. Such measurements may be referred to as an "early measurement". Moreover, the early measurement configuration and corresponding measurement results may still be stored while the UE moves from the (NR/LTE) RRC inactive state to the (NR/LTE) RRC idle state. In addition, in some embodiments, the UE may keep implementing early measurement (and/or keep the measurement results) based on the stored early measurement configuration (e.g., while the UE moves from the RRC inactive state to the RRC idle state within the same RAT). In some additional embodiments, the UE may keep implementing early measurement (and/or keep the measurement result) based on the stored early measurement configuration while the UE moves from the RRC inactive state to the RRC idle state of different RAT).

Figure 3A:
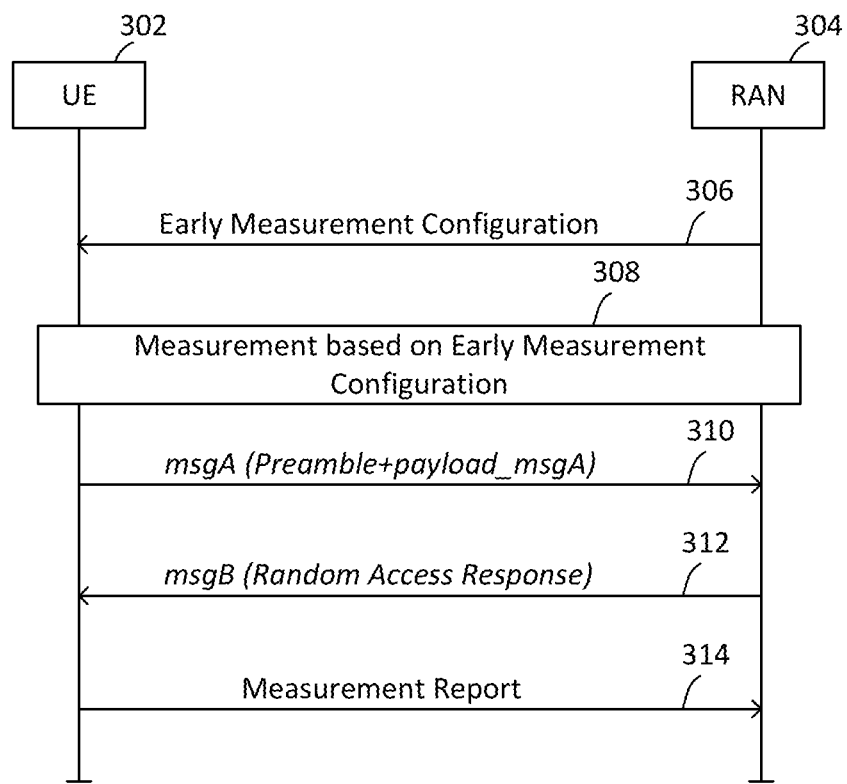
FIG. 3A illustrates a signaling flow of an early measurement procedure, in accordance with an implementation of the present disclosure.

FIG. 3A illustrates a signaling flow of an early measurement procedure, in accordance with an implementation of the present disclosure. As shown in FIG. 3A, in action 306, the UE 302 may receive a measurement configuration (e.g., an early measurement configuration) from the RAN 304 (e.g., a serving cell) via dedicated control signaling (e.g., RRCRelease message), broadcasting system information (e.g., System Information Block type 11, SIB11), or on-demand system information. For example, the UE 302 may receive the measurement configuration via an RRC release message with Suspend configuration, so the UE may move to the RRC inactive state after receiving the RRC release message with Suspend configuration. Moreover, the measurement configuration may be provided independently with the Suspend configuration in the RRCRelease message. Therefore, the UE may still keep the measurement configuration after the UE moves from RRC inactive state to RRC idle state (in contrast, the Suspend configuration may be removed (or released) after the UE moves from RRC inactive state to RRC idle state). In contrast, in some embodiments, the measurement configuration may be provided within the Suspend configuration (So, it means the measurement configuration is valid only while the UE is staying in RRC inactive state). In this condition, the UE may release the measurement configuration after the UE moves from the RRC inactive state to RRC idle state. Moreover, in some embodiments, the stored measurement result may or may not be removed with the release of measurement configuration. In another example, the UE 302 may receive the measurement configuration via an RRC release message without Suspend configuration, so the UE may move to the RRC idle state after receiving the RRC release message (without Suspend configuration). Then, the UE may start to implement measurement based on the measurement configuration while the UE is staying in RRC idle state.

In action 308, when the UE 302 operates in the RRC inactive state or RRC idle state, the UE 302 may perform the early measurement based on the received (early) measurement configuration. The early measurement may be performed by the UE 302 on the licensed bands or unlicensed bands. For example, if the early measurement is performed on the unlicensed bands (which may be referred to as "NR-U early measurement"), the early measurement configuration may include parameter(s) for the UE 302 to apply the NR-U DL-Reference Signal Received Power (RSRP)/DL-Reference Signal Received Quality (RSRQ)/Signal to Interference plus Noise Ratio (SINR) measurement, and/or the RSSI and CO measurement on the NR-U carriers of the NR-U serving cells/BWPs (and neighbor cells in some implementations). In some embodiments, if the early measurement are performed on the unlicensed bands (which may be referred to as "NR early measurement"), the early measurement configuration may include parameter(s) for the UE 302 to implement the NR DL-Reference Signal Received Power (RSRP)/DL-Reference Signal Received Quality (RSRQ)/Signal to Interference plus Noise Ratio (SINR) measurement, and/or the RSSI on the NR carriers of the NR serving cells/BWPs (and neighbor cells in some implementations).

In action 310, the UE 302, if operating in the RRC inactive state, may transmit the msgA to the serving RAN 304. The msgA may include, for example, an RRC resume request message with/without an indication that the "early measurement report (e.g., NR-U measurement and/or NR measurement) is available" while the RRC inactive UE 302 is requesting to resume its own RRC connection with the serving RAN 304.

After receiving the msgA successfully, the serving RAN 304 may provide the msgB to the UE 302. The msgB may include a dedicated RRC message (e.g., RRC resume message, RRC Setup message or RRC re-establishment message) and the (NR-U) radio resource allocation (e.g., the (NR-U) UL radio resource allocation in the RAR message (e.g., in the SuccessRAR message), or the radio resource configuration in the RRCConnectionReconfiguration message). In some implementations, the UE may set one bit in the msgA to "1" to show that the early measurement is available. In some implementations, the UE may set one bit in the msgA to "1" to show that the early measurement is available and also request a certain amount of UL radio resources (e.g., by sending a UL BSR in the msgA) to transmit the early measurement report to the serving RAN.

In action 312, after receiving the msgA, the serving RAN 304 (or serving cell) may transmit the msgB with the UL grant to the UE 302. In action 314, after receiving the msgB successfully, the UE 302 may transmit a measurement report (e.g., an NR-U measurement report and/or an NR measurement report) on the given UL grant. In some other implementations, the UE 302 may not set an indication in the msgA that the "early measurement is available," but may transmit a UL-BSR in the msgA for UL data transmission. In some implementations, after receiving the msgA, the serving RAN (or serving cell) may transmit the msgB with UL grant for the UE, and the UE may transmit an early measurement report via the received UL grant. In this condition, the serving RAN (or serving cell) may/may not indicate to the UE its request for the early measurement in the msgB.

Figure 3B:
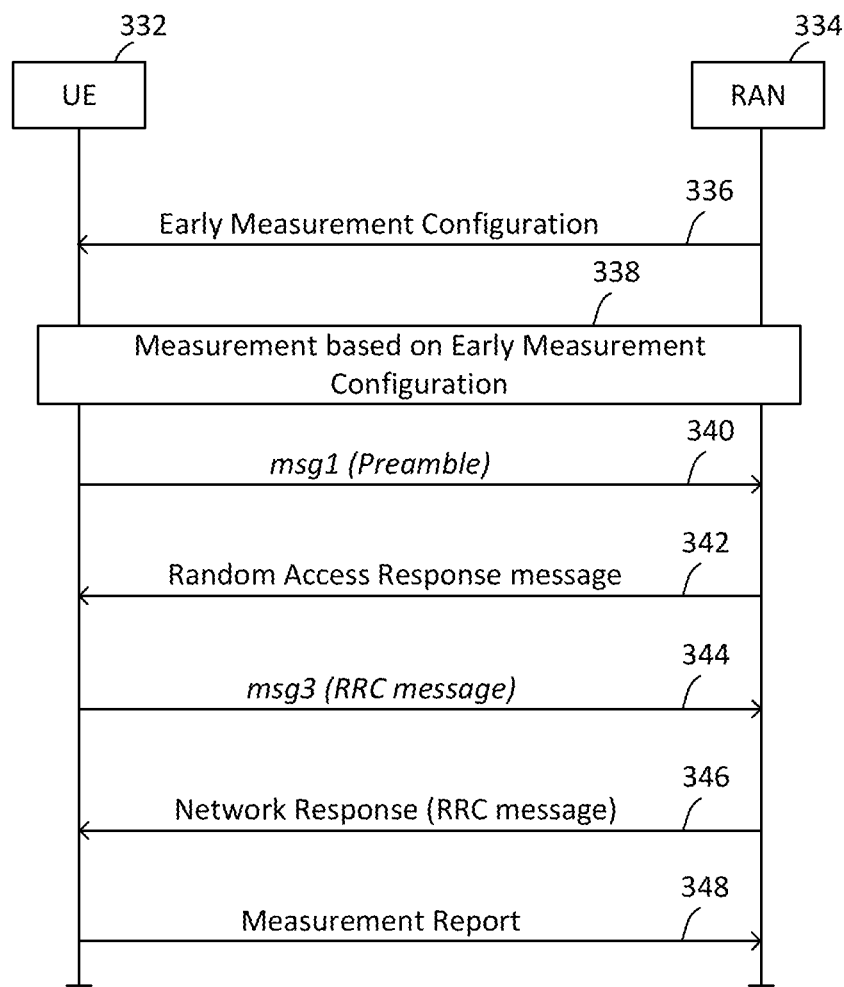
FIG. 3B illustrates a signaling flow of an early measurement procedure through a 4-step random access procedure, in accordance with an implementation of the present disclosure.

FIG. 3B illustrates a signaling flow of an early measurement procedure through a 4-step random access procedure, in accordance with an implementation of the present disclosure. As shown in FIG. 3B, in action 336, the UE 332 may receive a measurement configuration (e.g., an early measurement configuration) from the RAN 334 (e.g., a serving cell) via dedicated control signaling (e.g., RRCRelease message), broadcasting system information (e.g., System Information Block type 11, SIB11), or on-demand system information. For example, the UE 332 may receive the measurement configuration via an RRC release message with Suspend configuration, so the UE may move to the RRC inactive state after receiving the RRC release message with Suspend configuration. In another example, the UE 332 may receive the measurement configuration via an RRC release message without Suspend configuration, so the UE may move to the RRC idle state after receiving the RRC release message (with Suspend configuration).

In action 338, when the UE 332 operates in the RRC inactive state or RRC idle state, the UE 332 may perform the early measurement based on the received (early) measurement configuration. The early measurement may be performed by the UE 332 on the licensed bands or unlicensed bands. For example, if the early measurement is performed on the unlicensed bands (which may be referred to as "NR-U early measurement"), the early measurement configuration may include parameter(s) for the UE 332 to apply the NR-U DL-Reference Signal Received Power (RSRP)/DL-Reference Signal Received Quality (RSRQ)/Signal to Interference plus Noise Ratio (SINR) measurement, and/or the RSSI and CO measurement on the NR-U carriers of the NR-U serving cells/BWPs (and neighbor cells in some implementations).

When the 4-step RA procedure is initiated on the UE side, the UE may transmit a preamble (msg1) to the serving RAN, as shown in the msg1 in the action 340. After receiving the msg1 successfully, the serving RAN 334 may provide the Random Access Response message (msg2) to the UE 332 in the action 342. The msg2 (e.g., a SuccessRAR message) may include a Random Access-Radio Network Temporary Identifier (RA-RNTI) to indicate that the msg1 is received successfully by the serving BS. In addition, (NR-U) UL radio resource allocation may also be included in the RAR message for UE to transmit the following msg3 in the UL direction to the serving BS.

Then, in action 344, the UE 332, if operating in the RRC inactive state, may transmit the msg3 to the serving RAN 334. The msg3 may include, for example, an RRC resume request message with/without an indication that the "early measurement report (e.g., NR-U measurement) is available" while the RRC inactive UE 332 is requesting to resume its own RRC connection with the serving RAN 334. In some implementations, the UE may set one bit in the msg3 to "1" to show that the early measurement (for NR-U) is available. In some implementations, the UE may set one bit in the msg3 to "1" to show that the early measurement (for NR-U) is available and also request a certain amount of UL radio resources to transmit the early measurement report to the serving RAN. In some additional implementations, UL BSR may also be included in the msg3 for UL radio resource request.

After receiving the msg3 successfully, the serving RAN 334 (or serving cell) may transmit the Network Response to UE 332 in action 346. To UE 332, UE 332 may check whether the serving cell has received the msg3 successfully by receiving the network response from the RAN 334. Then, UE 332 may try to decode the Network Response by using a UE identification (e.g., a (temporary) C-RNTI, which may be configured by the serving RAN in the Random Access Response message). UE 332 receives the Network Response message successfully after the UE 332 decoding the Network Response message by using the (temporary) C-RNTI successfully. The Network Response message may include a dedicated RRC message (e.g., RRC resume message, RRC Setup message or RRC re-establishment message) and the (NR-U) UL radio resource allocation (e.g., the (NR-U) UL radio resource allocation for the UE to transmit the pending Measurement Report.

In action 348, after receiving the Network Response message from the serving RAN 334 successfully, the UE 332 may transmit a measurement report (e.g., an NR-U measurement report) on the given UL grant. In some other implementations, the UE 332 may not set an indication in the msg3 to indicate that the "early measurement is available," but may transmit an UL-BSR in the msg3 for UL data transmission. In some implementations, after receiving the msg3, the serving RAN (or serving cell) may transmit the Network Response message (Msg4) with the UL grant for the UE, and the UE may transmit an early measurement report via the received UL grant. In this condition, the serving RAN (or serving cell) may indicate to the UE its request for the early measurement in the msg4 (e.g., in the dedicated RRC message such as RRC resume message, RRC Setup message or RRC re-establishment message).

In some implementations, the early measurement configuration may be provided to the UEs via broadcasting message (e.g., system information or on-demand system information in the NR protocols), not via the RRC release message. However, it is also worthy to note that, in this condition, the UE may also receive the UE-specific early measurement configuration in an RRC message (e.g., the RRC Release message or the RRC reconfiguration message) and the UE may still apply the UE-specific NR-U measurement configuration, rather than the cell-specific early measurement configuration. Here, the UE-specific early measurement configuration may be associated with different radio access technologies (RATs), such as NR, E-UTRA, or NR-U, License Assisted Access (LAA).

In some implementations, the early measurement configuration may indicate whether the UE is allowed to transmit the early measurement report (to the serving cell) through the 2-step RA procedure (e.g., an RA procedure including the msgA transmission and the msgB reception). In some implementations, there may be a 2-step RA procedure configuration provided in the system information or in the RRC signaling to the UE to indicate whether the UE is allowed to transmit the early measurement report through the 2-step RA procedure.

Although some implementations of the present disclosure are described based on the NR-U measurement, the present disclosure is not limited thereto. For example, the proposed implementations may be also applicable to NR/LTE protocols in the licensed bands. In addition, (part of) the implementations of the NR-U measurement (e.g., via the early measurement configuration) may also be applicable to an RRC idle UE.

Implementations of (NR-U) Measurement

In some implementations, from the perspective of UE, the target NR-U carrier for the NR-U measurement and/or for the proposed 2-step RA procedure may be an Spcell (e.g., the PCell in a Master Cell Group (MCG) of the UE, a PSCell in a Secondary Cell Group (SCG)), a Secondary Cell (SCell) (which may be in an activated state, a deactivated state, or a dormant state), or a PUCCH (Physical Uplink Control Channel) SCell. A PUCCH SCell may be a cell configured with the PUCCH physical resource.

The methods described herein may be based on the assumption that the UE operates in the RRC connected state in some implementations. However, the methods may be also applicable to the UE(s) operating in RRC inactive/idle state (e.g., via the early measurement configuration) in some other implementations.

In some implementations, a UE may be configured with multiple candidates of NR-U carriers (or NR-U BWPs). Thus, the UE may perform RSSI measurement and/or CO measurements on these candidates continuously (e.g., based on the given NR-U measurement configuration). In addition, the UE may report the RSSI & CO measurement to the serving cell through the 2-step RA procedure. After receiving the msgA, the serving cell may configure the NR-U radio resource on the monitored NR-U carrier. The methods can be applied to help the UE report the appropriate NR-U carrier/BWP (and/or help the UE report the non-appropriate NR-U carrier/BWP). By taking the UE mobility into account, the UE may provide its measurement report on the msgA effectively and the handover performance in the NR-U may also be improved (e.g., the gNB may provide the handover command or the conditional handover command, such as the RRC connection reconfiguration message (RRC-ConnectionReconfiguration) in the msgB).

Although, in some implementations, the methods are based on the NR-U CO measurement and the RSSI report, the methods may also be applied to report other measurement results (e.g., the NR-U RSRP/RSRQ/RSSI/SINR measurement report or NR RSRP/RSRQ/SINR/RSSI measurement report, the beam measurement, or the measurement of other RATs, such as Wi-Fi).

Moreover, the methods may also be applicable to other RATs without being limited by the NR-U. For example, the methods may be applied to LAA in the LTE protocols.

In NR-U, the 2-step RA procedure (e.g., for the NR-U measurement report transmitted through the 2-step RA procedure) may be implemented in parallel with other UL packet delivery procedures (e.g., the NR-U measurement report through the configured grants or the NR-U measurement transmission via the SR/BSR request for the UL grant). A UE may initiate the Listen-Before-Talk (LBT) procedures on a PRACH, a PUCCH, and on the configured grant (e.g., a PUSCH) respectively for an NR-U measurement report while the UL carrier is implemented on the unlicensed band(s). The UE may transmit the NR-U measurement report based on the result of the parallel LBT procedures. In addition, the UE may trigger these procedures without regard to the order of these LBT events. The NR-U measurement report can be transmitted faster in time.

In some implementations, the NR-U UL carrier may be implemented on a wideband carrier (e.g., a 100 Mega Hertz (MHz) continuous bandwidth in the frequency domain) on an unlicensed band. In addition, the wideband carrier may be divided into several separated and non-overlapped sub-channels (For example, the 100 MHz carrier may be separated into 5 independent sub-channels, where each sub-channel may occupy 20 MHz bandwidth) in the frequency domain. In some implementations, each sub-channel may be configured with an independent PRACH configuration and a PUSCH configuration. The UE may perform the LBT procedure on the wideband carrier or any combination of the sub-channels independently. For the msgA delivery, the UE may transmit a msgA on one of the sub-channels (e.g., on the corresponding PRACH (& PUSCH) resource) for which the LBT procedure is successful. So, to the UE, the LBT bandwidth, which is the range of the bandwidth that the UE performs the LBT procedure, may lie on the bandwidth of one sub-channel. The UE may report the NR-U measurement report (especially the RSSI and CO) to the serving cell effectively. In some implementations, more than one msgA may be transmitted independently by the UE on all or a subset of the sub-channels on which the corresponding LBT procedures are successfully. In this condition, the serving cell may reply one msgB (also on the associated PDCCH/PDSCH associated with the sub-channel) to each msgA respectively in the corresponding sub-channel(s). In some implementations, the UE may transmit one (or more than one) msgA only if the LBT procedure is successful at the UE in all the configured LBT bandwidths (in other words, the LBT is successful on the wide NR-U carrier).

1. Negotiation Procedure

Figure 4:
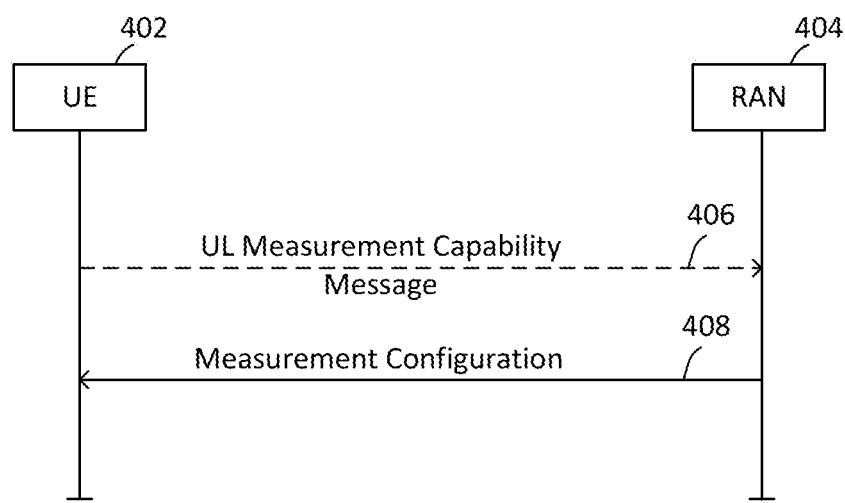
FIG. 4 illustrates a signaling flow of a measurement negotiation procedure, in accordance with an implementation of the present disclosure.

FIG. 4 illustrates a signaling flow of a measurement negotiation procedure, in accordance with an implementation of the present disclosure.

As shown in FIG. 4, in action 408, the RAN 404 (e.g., a gNB or a serving cell) may transmit a measurement configuration (e.g., an NR-U measurement configuration) to the UE 402 via the dedicated control signaling (e.g., via an RRC message, such as an RRCConnectionReconfiguration message).

In some implementations, the UE 402 may need to indicate to the RAN 404 that the UE 402 can support the RSSI measurement and the CO measurement by sending a particular Information Element (IE) "rssi-AndChannelOccupancyReporting"={support} in the UL measurement capability message to the RAN 404. As shown in action 406, the UE 402 may transmit its UL measurement capability message to the RAN 404. In some implementations, the UE 402 may indicate the rssi-AndChannelOccupancyReporting to the RAN 404 only when the DL LAA or NR-U operation is supported by the UE capability. In some implementations, the UE 402 may indicate to the RAN 404 that the UE 402 is capable of performing the "NR-U measurement" (or NR measurement/E-UTRA measurement/LAA measurement) via the UL measurement capability message. An example Text Proposal (TP) is shown below:
rssi-AndChannelOccupancyReporting={support} (otherwise, this IE may be absent if the UE does not support RSSI & CO measurement report)

Indicates whether the UE supports performing measurements and reporting of RSSI and CO. This field may be included only if DL LAA or NR-U operation is supported in UE capability.

In some implementations, as a reply to the UL measurement capability message, the RAN 404 may configure a measurement configuration for the early measurement to the UE through the dedicated control signaling (e.g., in an RRC message, such as an RRCRelease message or an RRCConnectionReconfiguration message). In some implementations, the measurement configuration for the early measurement may be provided in a suspend configuration (Suspendconfig), which means the UE 402 may not reuse this measurement configuration after the UE 402 transitions from the RRC inactive state to the RRC idle state. In some other implementations, the measurement configuration for the early measurement may be provided independently with the Suspendconfig in the RRCRelease message. In some implementations, the UE 402 may reuse this measurement configuration after transitioning from the RRC inactive state to the RRC idle state. In some implementations, an ongoing early measurement procedure may not be interrupted by the RRC state transition.

In some implementations, after the UE 402 informs the RAN 404 of the rssi-AndChannelOccupancyReporting={support} in the UL measurement capability message, the IE rssi-AndChannelOccupancyReporting may still be regarded as "not support" automatically to the serving RAN 404 if the UE 402 further informs the serving RAN 404 that the UE 402 is under a power saving mode (or a temporarily capability restriction mode) while the UE 402 is in a specific condition (e.g., overheating condition). The serving RAN 404 may not expect that the UE 402 may report the (NR-U) measurement report (e.g., the CO report) through the 2-step/4-step RA procedure. The rssi-AndChannelOccupancyReporting may be regarded as 'support' automatically to the serving RAN 404 again after the UE 402 sends another dedicated control message to the serving RAN 404 to indicate that the UE 402 leaves the power saving mode (or temporarily capability restriction mode). In some implementations, there may be an IE "rssi-AndChannelOccupancyReporting_2stepRA"={support} to indicate that the UE supports the RSSI and CO report through the 2-step RA procedure on the NR-U carriers (in comparison, this IE may not be provided in the UE capability signaling (e.g., e.g., the UL measurement capability message) if the UE does not support the NR-U measurement reporting through the 2-step RA procedure on the NR-U carriers). In some implementations, there may be an IE "NRU_2StepRA"={support} in the UE capability signaling to indicate that the UE 402 supports the 2-step RA procedure in the NR-U frequency carriers. The serving RAN 404 may be informed that the UE 402 supports the NR-U measurement reporting (e.g., NR-U RSSI or Channel Occupancy Report) through the 2-step RA procedure after receiving both the "NRU_2StepRA"={support} and the "rssi-AndChannelOccupancyReporting"={support} in UE capability signaling. In contrast, the serving RAN 404 may expect that the UE 402 does not support the NR-U measurement reporting through the 2-step RA procedure if either the "NRU_2StepRA" or the "rssi-AndChannelOccupancyReporting" (or both) is (are) not shown in the UE capability signaling. In some other implementations, the serving RAN 404 may be informed that the UE 402 supports the NR-U measurement reporting through the 2-step RA procedure after receiving the "NRU_2StepRA"={support} alone. That is, the NRU_2StepRA may implicitly indicate that the NR-U measurement reporting through the 2-step RA procedure is supported to the UE 402. Here, the UE capability report may also be associated with different RATs, such as NR (e.g., NRU_2StepRA={support}), E-UTRA (e.g., EUTRA_2StepRA={support}), NR (e.g., NR_2StepRA={support}), or LAA (e.g., LAA_2StepRA={support}).

In some implementations, the serving RAN 404 may enable (or disable) the UE 402 to provide the (NR-U) measurement report by transmitting the (NR-U) measurement configuration to the UE 402. For example, the serving RAN 404 may set one bit in the (NR-U) measurement configuration to "1" (or "enabled") to enable the UE 402 to provide the (NR-U) measurement report via the 2-step RA procedure (and/or 4-step RA procedure). In contrast, the serving RAN 404 may set one bit in the (NR-U) measurement configuration to "0" (or "disabled") to disable the UE 402 from providing the (NR-U) measurement report through 2-step RA procedure (and/or 4-step RA procedure). In some implementations, the enable/disable bit may be provided in (on-demand) system information.

The serving RAN 404 may also enable (or disable) the UE 402 to provide the (NR/E-UTRA) measurement report by transmitting the (NR/E-UTRA) measurement configuration to the UE 402. For example, the serving RAN 404 may set one bit in the (NR/E-UTRA) measurement configuration to "1" (or "enabled") to enable the UE 402 to provide the (NR/E-UTRA) measurement report via the 2-step RA procedure (and/or 4-step RA procedure). The serving RAN 404 may set one bit in the (NR/E-UTRA) measurement configuration to "0" (or "disabled") to disable the UE 402 from providing the (NR/E-UTRA) measurement report through 2-step RA procedure (and/or 4-step RA procedure). In some implementations, the enable/disable bit may be provided in (on-demand) system information.

In some implementations, the UL measurement capability message (e.g., the NR-U measurement capability message) may be transmitted via the dedicated control signaling (e.g., UE Capability Information). In some implementations, the UE may provide the UE Capability Information, which includes the (NR/NR-U/E-UTRA) measurement capability message, after receiving the UE capability enquiry message from the serving RAN 404.

One example of the (NR-U) measurement configuration is in Table 1:

TABLE 1

| | (NR-U) Measurement configuration |
|---|---|
| measId | In some implementations, the NR-U Measurement report may be associated with a measId (measurement identity), which each measId is associated with one measurement object and one report configuration. The measurement object and report configuration are pre-configured in the dedicated control signaling (e.g., RRC Connection Re-configuration message). |
| Measurement object Configuration | Indicates the target frequency, cell, and some control parameters for UE to perform NR-U measurement. One implementation of the NR-U Measurement object is provided in Table 2. |
| Report configuration | Indicates the triggering conditions, NR-U measurement report procedure, or configuration for the proposed NR-U measurement report through 2-step/4-step RA procedure. One implementation of the Report configuration is provided in Table 3. |

The measurement object (MO) configuration may include the target frequency and cell information (and/or BWP information) for the UE to locate the target frequency/cell. In some implementations, additional IEs TimeToTrigger and TimeToTrigger-SF may also be provided in the measurement object configuration. An example of the measurement object configuration is shown in Table 2.

TABLE 2

| | Measurement Object configuration |
|---|---|
| Carrier Frequency | Indicates the target frequency carrier (e.g., by ARFCN (absolute radio-frequency channel number) for NR CC (ARFCN-ValueNR) or for E-UTRA (ARFCN-ValueEUTRA), E-ARFCN) |
| Cell identity | Indicates the Cell identity of the configured cell for this MO.<br>In some implementations, the Cell identity is represented by the physical cell identity (PCI) or cellidentity of the configured Cell.<br>In some other implementations, the Cell identity is represented by the SCellindex (pre-configured to the UE through dedicated control signaling) of the configured cell.<br>In some implementations, the Cell identity is represented by the servingCellIndex of the configured cell. |
| Bandwitdh Part (BWP) identity | In some implementations, serving cell may configure the BWP identity to the corresponding measurement object. In this condition, the UE is already configured with at least one Bandwidth Part configuration in the corresponding cell. One BWP configuration may include:<br>(a) Bandwidth Part identity<br>(b) Frequency domain location and bandwidth of this bandwidth part.<br>(c) Cyclic prefix<br>(d) Subcarrier space<br>(e) RACH resource configuration,<br>(f) Reference signaling configuration (e.g., channel state information reference signal (CSI-RS), or Synchronization Signal Block (SSB)).<br>So, the UE may be informed how to perform NR-U measurement & report on the indicated BWP based on the received BWP ID. |
| rmtc-Config | Parameters applicable to RSSI and CO measurement on the carrier frequency indicated by carrierFreq or by the BWP identity.<br>rmtc-Period<br>Indicates the RSSI measurement timing configuration (RMTC) periodicity for this frequency. Value ms40 corresponds to 40 ms periodicity, ms80 corresponds to 80 ms periodicity and so on. In some implementations, rmtc-Period =ENUMERATED {ms40, ms80, ms160, ms320, ms640},<br>rmtc-SubframeOffset<br>Indicates the RSSI measurement timing configuration (RMTC) subframe offset for this frequency. The value of rmtc-SubframeOffset should be smaller than the value of rmtc-Period. For inter-frequency measurements, this field is optional (e.g., rmtc-SubframeOffset = |

TABLE 2-continued

Measurement Object configuration

|  |  |
|---|---|
|  | INTEGER(0..639)) and if it is not configured, the UE chooses a random value as rmtc-SubframeOffset for measDuration which shall be selected to be between 0 and the configured rmtc-Period with equal probability.<br>measDuration<br>Number of consecutive symbols for which the Physical Layer reports samples of RSSI (Received Signal Strength Indication).<br>The value may be {sym1, sym14, sym28, sym42, sym70}, where sym1 corresponds to one symbol, sym14 corresponds to 14 symbols, and so on. |
| TimeToTrigger | Specifies the time period during which one specific triggering criteria must be met as long as the TimeToTrigger in order to trigger a NR-U measurement report. |
| timeToTrigger-SF | Indicates the scaling factor for TimeToTrigger adjustment based on the UE's speed state while doing NR-U measurements. In this IE, different scaling factors for the UE in different speed states (e.g., Low-mobility, medium-mobility, high-mobility) may be configured to the UE. |
| measCycleSCell | The parameter is used only when an SCell is configured on the frequency indicated by the measObject and is in deactivated state or the SCell is not configured.<br>Value range of measCycleSCell may be {sf160, sf256, sf320, sf512, sf640, sf1024, sf1280, spare1}, wherein sf160 corresponds to 160 sub-frames, sf256 corresponds to 256 sub-frames and so on. |

Additionally, the report configuration may be provided in the (NR-U) measurement configuration to configure the UE when and how to perform the NR-U measurement reporting to the serving RAN. An example of the report configuration is shown in Table 3.

TABLE 3

Report Configuration

| MeasID | MeasId is used to identify a measurement configuration, i.e., linking of a measurement object and a reporting configuration. The UE may identify when to report the measurement results through the (2-step/4-step) RA procedure. |
|---|---|
| Triggering Events | 'Periodical'<br>ReportInterval may also be included in the Report Configuration if 'periodical' event is configured.<br>The value of ReportInterval may be<br>{ms120, ms240, ms480, ms640, ms1024, ms2048, ms5120, ms10240, min1, min6, min12, min30, min60, spare3, spare2, spare1}, which Value ms120 corresponds with 120 ms, ms240 corresponds with 240 ms and so on, while value min1 corresponds with 1 min, min6 corresponds with 6 min and so on.<br>'Event O1': The CO (of the configured NR-U carrier) is above a threshold ($T_{o1}$).<br>$T_{o1}$ may also be included in the Report Configuration if Event O1 is configured.<br>The value of $T_{o1}$ may be an integer in the range between (0, 100).<br>'Event O2': The CO (of the configured NR-U carrier) is under a threshold (($T_{o2}$)).<br>$T_{o2}$ may also be included in the Report Configuration if Event O2 is configured.<br>The value of $T_{o2}$ may be an integer in the range between (0, 100). |
| channelOccupancyThreshold | RSSI threshold which is used for CO evaluation. |
| 2-StepRACHReport | gNB may further enable/disable the UE to report the CO measurement through 2-step RA procedure after the UE indicates that the UE itself is capable of rssi-AndChannelOccupancyReporting.<br>2-StepRACHReport={enabled, disabled}<br>Also note:<br>(1) In some implementations, the default setting of the NR-U reporting through 2-step RA procedure is 'enabled'. The gNB may further provide this IE to disable the procedure by setting the<br>rssi-AndChannelOccupancyReporting=disabled.<br>Otherwise, the gNB need not further indicate this IE.<br>(2) In some implementations, the default setting of the NR-U reporting through 2-step RA procedure is 'disabled'. Tthe gNB may further provide this IE to enable the procedure by setting the<br>rssi-AndChannelOccupancyReporting = enabled. Otherwise, the gNB need not further indicate this IE.<br>(3) In some implementations, there is no default setting of NR-U measurement reporting through 2-step RA procedure and the gNB must provide this IE in every configuration (or re-configuration).<br>(4) In some implementations, the 2stepRACHReport may be enabled/disabled based on the mobility state of the UE.<br>2-StepRACHReport = Sequence {Low-mobility, medium-mobility, high-mobility}<br>So, gNB may further indicate that the 2-StepRACHReport is enabled while the UE is under low, medium mobility, or high mobility by configuring<br>2-StepRACHReport = {Low-mobility, medium-mobility, high-mobility} |

TABLE 3-continued

| | Report Configuration |
|---|---|
| | After receiving the configuration above, the UE may not implement 2-StepRACHReport while the UE is at high-mobility state. In some implementations, the UE may apply 4-stepRACHReport if the 2-StepRACHReport is not allowed (or not configured) by the serving cell. In some implementations, UE may determine its mobility state based on the rules in LTE specifications.<br>Note: in some implementations, this IE may be absent. The UE may obtain whether the serving cell enable/disable 2-stepRACHReport by checking the IE '2-StepRACHReport configuration' is provided. |
| 2-StepRACHReport configuration | Configuration for the UE to provide NR-U measurement report through the 2-step RA procedure (If the 2-stepRACHReport is enabled to the UE). In another implementation, this IE may be provided but the UE is not allowed to apply this IE because 2-stepRACHReport=disabled). This configuration may further comprise:<br>(1) One or more than one preamble for the UE to transmit in the msgA.<br>(2) Physical resource block configuration in time domain, frequency domain, code domain, for the UE to transmit msgA.<br>(3) Maximum number of 2-step RA attempts for the NR-U measurement report. The UE may abandon NR-U measurement report through the 2-step RA procedure (such that the UE may transmit the NR-U measurement report by requesting uplink grant on PUSCH (Physical Uplink Shared Channel)) if the number of 2-step RA attempt failure is over the maximum number of attempts.<br>(4) RA-search space configuration for the UE to monitor the msgB.<br>In some implementations, gNB may also provide a 'default' 2-Step RA configuration through broadcasting (e.g., (on demand) system information) or dedicated control signalling. If 2-stepRACHReport configuration is absent, the UE may apply the NR-U measurement report based on the default configuration of 2-Step RA procedure. In some implementations, the default 2-stepRA configuration may be overwritten by the 2-stepRACHReport configuration transmitted through dedicated control signalings. In addition, for a handover improvement scenario, the UE may be pre-configured with dedicated 2-step RA resource, which includes a dedicated preamble (by pre-configuring a preambleindex to the UE), a dedicated physical resource (by pre-configuring a physical resource block index) |

2. msgA Signaling

In some implementations, after receiving the (NR-U) measurement configuration successfully, a UE may start to monitor the (NR-U) carriers and then report the (NR-U) measurement report through the 2-step RA procedure. The msgA may include a preamble and a payload (e.g., the control signaling delivered through a PUSCH). In some implementations, the control signaling to an RRC connected UE may include the UE ID (e.g., the Cell-Radio Network Temporary Identifier (C-RNTI)) and the (NR-U) measurement report (e.g., the RSSI & CO measurement report). In some implementations, the preamble may be selected by the UE autonomously from a set of applicable preambles configured by the serving cell (e.g., configured by the (NR-U) measurement configuration or configured by the system information (e.g., SystemInformationBlockType1) broadcasted by the serving cell). In some implementations, the preamble(s) and the associated RA resource may be configured in the (NR-U) measurement configuration for the UE to apply the (contention-based/contention-free) 2-step RA procedure.

In some implementations, the (NR-U) measurement report may include the UE's measurement result implemented by following the (NR-U) measurement configuration. In some implementations, in the msgA, the preamble and the following payload (e.g., payload msgA, transmitted via the PUSCH) may be transmitted independently. For example, the preamble and the payload msgA may be transmitted in different physical radio resource block(s) and the UE may need to apply the LBT protocol to the preamble transmission and the payload msgA delivery independently. There may be an association between the physical resource blocks for the preamble and payload msgA transmission and the UE(s) may only need to apply the LBT protocols one time to transmit both the preamble and the payload msgA.

Examples of the (NR-U) measurement report in the msgA are summarized in Table 4.

TABLE 4

| Format | Description | Size requirement |
|---|---|---|
| 1. (Indication of under/above given threshold). | Event 1) The CO measurement result of one NR-U cell/BWP (the NR-U cell may or may not be the same as the NR-U carrier/BWP which the msgA is transmitted) is lower/higher than a given threshold.<br>⇒ (A) The NR-U measurement report includes one bit, wherein the bit is set to 1 if the measurement result on the cell/BWP/sub-channel is higher than the threshold. The bit may be set to 0 if the measurement result on the concerned cell/BWP/sub-channel is lower than the given threshold (channelOccupancyThreshold). | There may be up to 23 + X bits for RSSI and CO report:<br>(1) 7 bits for RSSI report (by referring to TS 36.331, RSSI result may be presented by RSSI-Range (integer(0...76)).<br>(2) 1 bit in the NR-U measurement report (CO measurement is above/below the given threshold).<br>(3) Up to 7 bits for cell/BWP indication.<br>5 bits cell index to represent the indicated cell. (For example, PCI, SCellindex or ServCellIndex (integer(0...31))<br>2 bits BWP index<br>(4) 8 bits Medium Access Control (MAC) |

TABLE 4-continued

| Format | Description | Size requirement |
|---|---|---|
| | ⇒ (B) The threshold may be configured by dedicated control signaling (e.g., RRC Connection Reconfiguration message or RRCRelease message) or through broadcasting message (e.g., System information or on-demand System information in New Radio protocols). | subheader.<br>(5) X bits RRC signaling overhead for Measurement Report.<br>Signaling overhead (24 bits):<br>(6) 16 bits UE ID (e.g., C-RNTI-value)<br>(7) 8 bits MAC subheader.<br>⇒ About 47 + X bits in the msgA.<br>(assuming 72 bits msgA size). |
| 2. (Percentage report) | ⇒ (C) In some implementations, UE obtains CO measurement by setting the rounded percentage of sample values which are beyond the channelOccupancyThreshold within all the sample values in the report Interval. (Event 2) CO measurement report of a NR-U cell (The NR-U cell/BWP may or may not be the same as the NR-U carrier/BWP/sub-channel which the msgA is transmitted) is lower/higher than a given threshold.<br>⇒ UE obtains CO measurement by setting the rounded percentage of sample values which are beyond the channelOccupancyThreshold within all the sample values in the report Interval.<br>⇒ In msgA, the value of CO may be represented by an integer between (0, 100), wherein Value 0 corresponds to 0, value 1 to 0.01 (1%), value 2 corresponds to 0.02 (2%), and so on. | There may be up to 29 +X bits for RSSI and CO report:<br>(1) 7 bits for RSSI report (by referring to TS 36.331, RSSI result may be presented by RSSI-Range (integer(0...76)).<br>(2) 7 bits in the NR-U measurement report (percentage).<br>(3) Up to 7 bits for cell/BWP/sub-channel indication.<br>5 bits cell index to represent the indicated cell. (For example, SCellindex or ServCellIndex (integer(0...31))<br>2 bits BWP index.<br>(4) 8 bits MAC subheader.<br>(5) X bits RRC signaling overhead for Measurement Report.<br>Signaling overhead (24 bits):<br>(1) 16 bits UE ID (e.g., C-RNTI-value)<br>(2) 8 bits MAC subheader.<br>⇒ About 53 + X bits in the msgA (assuming 72 bits msgA size). |

Figure 5:
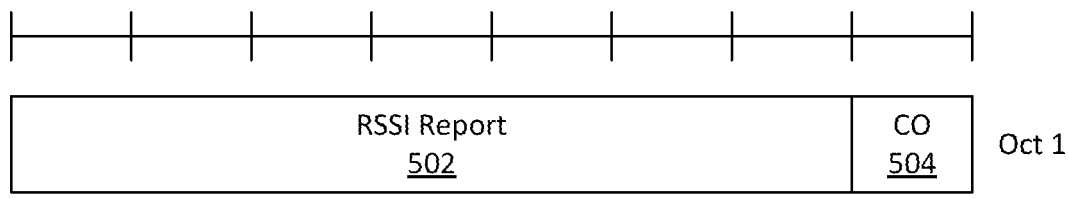
FIGS. 5 and 6 are diagrams illustrating different formats of MAC CEs, in accordance with implementations of the present disclosure.
Figure 6:
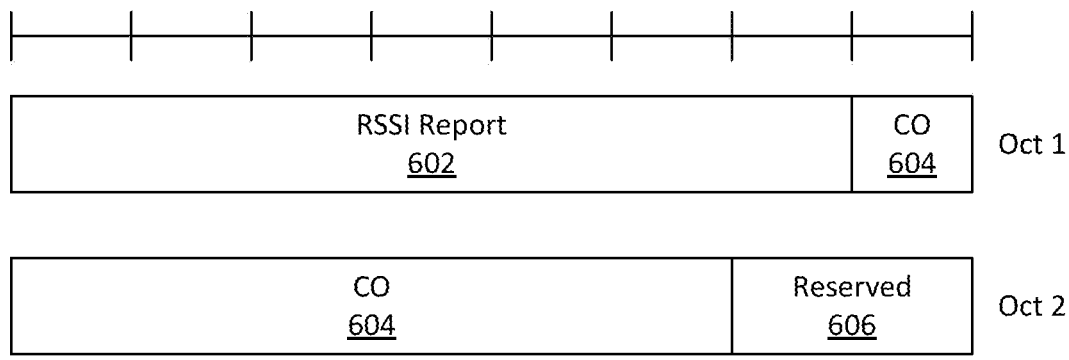

(1) The value X depends on the RRC signaling structure for the measurement report (at least 3 bits for RRC signaling type indication & up to 8 bits MeasID indication).
(2) In some other implementations, the UE may just indicate the (NR-U) measurement report (or Early measurement) is available (1 bit signaling overhead).
(3) In some implementations, the RSSI and CO measurement report may be provided in the MAC Control Element (CE). FIGS. 5 and 6 are diagrams illustrating different formats of MAC CEs, in accordance with implementations of the present disclosure. As shown in FIG. 5, an RSSI report 502 with a 1-bit indication 504 for the CO may be provided in a MAC CE. Also, referring to FIG. 6, a 7-bit RSSI report 602 and a 7-bit CO report 604 (in percentage) with a 1-bit reserved field 606 are provided in a MAC CE. In some implementations, the MAC sub-header, in which the Logical Channel ID (LCID) may be defined to indicate the RSSI/CO report, may also be transmitted along with the MAC CE. After decoding the MAC sub-header successfully, the serving cell may be informed how to decode the information contained in the MAC CE.
(4) The msgA may further include control messages, such as short BSR (Buffer Status Report) or short truncated BSR (16 bits) or (UL) Power Headroom Report (24 bits) for UL packet delivery (e.g., NR-U measurement report).
(5) The UE may transmit the whole NR-U Measurement report (not being limited by RSSI&ChannelOccupancy report) by providing UL-BSR in the msgA for Measurement report.

In some implementations, a UE may provide the RSSI & CO measurement of the target NR-U carrier (e.g., associated with an PCI, SCell index (Scellindex) of a measurement ID (measID)) in the msgA. In some implementations, since the msgA size may be limited to less than 56 or 72 bits, the UE may not transmit the precise RSSI & CO measurement report in the msgA. Thus, the UE may transmit a simplified indication for the (NR-U) measurement report. For example, the UE may transmit a simplified under-Threshold indicator in the msgA to inform the serving cell that the CO measurement in the corresponding NR-U carrier observed by the UE is below a pre-defined threshold (e.g., the $T_{o2}$ in the Event O2 in Table 3). In some implementations, the UE may also transmit another simplified Above-Threshold indicator in the msgA to inform the serving cell that the CO measurement in the corresponding NR-U carrier observed by the UE is above a pre-defined threshold (e.g., the $T_{o1}$ in the Event O1 in Table 3). In some implementations, the UE may transmit a UL BSR in the msgA (e.g., for the NR-U measurement report (for an RRC connected UE) or the early measurement report (for an RRC idle/inactive UE)). After receiving the msgA, the serving cell may configure the UL resource grant (by referring to the received UL-BSR) in the msgB for the UE to report the (NR-U) measurement report (or the early measurement report). In the present disclosure, an "RRC connected UE" may refer to a UE operating in an RRC connected state, an "RRC inactive UE" may refer to a UE operating in an RRC inactive state, and an "RRC idle UE" may refer to a UE operating in an RRC idle state.

In some implementations, to an RRC inactive UE, the serving cell may provide the UL grant for the early measurement report only when the security is activated by the serving cell in the msgB (e.g., the UE sends the RRCResumeRequest message via the msgA and the serving cell responds to the UE with the RRCResume message in the msgB with the UL grant. In some implementations, the security may be activated at the UE side after the UE receives the RRCResume message successfully. In addition, the UE may provide the early measurement report with the activated security keys. In some other implementations, the serving cell may directly request the UE to report the (NR-U) measurement report in the msgB (e.g., by indicating the early measurement request and configuring the UL grant in the msgB with the RRCResume message), without regard to whether the UE indicates the early measurement is available or whether the UE provides the UL-BSR in the msgA. The UE may transmit the early measurement to the serving cell in the following RRCResumeComplete message, which may be transmitted in Signaling Radio Bearer 1 (SRB1) with activated security keys.

In some other implementations, to an RRC idle UE, the serving cell may provide the UL grant for the early measurement report only when the security is activated by the serving cell in the msgB (e.g., the UE sends the RRCSetupRequest (or RRCConnectionRequest) message via the msgA and the serving cell responds to the UE with the RRCSetup (or RRCConnectionSetup) message in the msgB with the UL grant. In some implementations, the security may be activated at the UE side after the UE receives the RRCSetup (or RRCConnectionSetup) message successfully. In addition, the UE may provide the early measurement report with the activated security keys. In some other implementations, the serving cell may directly request the UE to report the (NR-U) measurement report in the msgB (e.g., by indicating the early measurement request and configuring the UL grant in the msgB with the RRCSetup (or RRCConnectionSetup) message), without regard to whether the UE indicates the early measurement is available or whether the UE provides the UL-BSR in the msgA. The UE may transmit the early measurement to the serving cell in the following RRCSetupComplete (or RRCConnectionSetupComplete) message, which may be transmitted in Signaling Radio Bearer 1 (SRB1) with activated security keys. In some other embodiments, the UE may indicate that early measurement is available (e.g., early measurement associated with NR, NR-U, E-UTRA or LAA available) in the RRCSetupComplete (or RRCConnectionSetupComplete) message by triggering one additional indicator (with the associated RAT) in the RRCSetupComplete (or RRCConnectionSetupComplete) message as '1' (or 'true'). Then, the serving cell may request the early measurement report from the UE by sending a 'Early measurement Enquiry message (with at least one of the indicated associated RAT)' to the UE. After receiving the 'Early measurement Enquiry message', the UE would deliver the requested early measurement report (e.g., retained by the UE before the RRC Connection Establishment procedure) to the serving cell in one dedicated Uplink (RRC) signaling after the UE RRC Connection Establishment procedure is finished.

In some implementations of the 4-step RA procedure, the serving cell may provide the UL grant to an RRC inactive UE for the early measurement report only when the security is activated by the serving cell in the Network Response message (msg4) (e.g., the UE sends the RRCResumeRequest message via the msg3 and the serving cell responds to the UE with the RRCResume message in the msg4 with the UL grant. In some implementations, the security may be activated at the UE side after the UE receives the RRCResume message successfully. In addition, the UE may provide the early measurement report with the activated security keys. In some other implementations, the serving cell may directly request the UE to report the (NR-U) measurement report in the msg4 (e.g., by indicating the early measurement request and configuring the UL grant in the msg4 with the RRCResume message), without regard to whether the UE indicates the early measurement is available or whether the UE provides the UL-BSR in the msg3. The UE may transmit the early measurement to the serving cell in the following RRCResumeComplete message, which may be transmitted in Signaling Radio Bearer 1 (SRB1) with activated security keys.

In some implementations of 4-step RA procedure, to an RRC idle UE, the serving cell may provide the UL grant for the early measurement report only when the security is activated by the serving cell in the Network Response message (msg4) (e.g., the UE sends the RRCSetupRequest (or RRCConnectionRequest) message via the msg3 and the serving cell replies the UE with the RRCSetup (or RRCConnectionSetup) message in the msg4 with the UL grant. In some implementations, the security may be activated at the UE side after the UE receives the RRC(Connection)Setup message successfully. In addition, the UE may provide the early measurement report with the activated security keys. In some other implementations, the serving cell may directly request the UE to report the (NR-U) measurement report in the msg4 (e.g., by indicating the early measurement request and configuring the UL grant in the msg4 with the RRC (Connection)Setup message), without regard to whether the UE indicates the early measurement is available or whether the UE provides the UL-BSR in the msg3. The UE may transmit the early measurement to the serving cell in the following RRC(Connection)SetupComplete message, which may be transmitted in Signaling Radio Bearer 1 (SRB1) with activated security keys.

In some additional embodiments, the serving cell may transmit the RRCSetup message to the UE after receiving the RRCResumeRequest message from the UE. The serving cell may still directly request the UE to report the (NR-U) measurement report in the msgB (e.g., by indicating the early measurement request and configuring the UL grant in the msgB with the RRCSetup message), without regard to whether the UE indicates the early measurement is available or whether the UE provides the UL-BSR in the msgA. The UE may transmit the early measurement to the serving cell in the following RRCSetupComplete message, which may be transmitted in Signaling Radio Bearer 1 (SRB1) with activated security keys. This embodiment may utilize the 2-step RA procedure or 4-step RA procedure.

3. msgA Delivery

In some implementations, after determining the format of the msgA, the UE may send the msgA on the configured RACH resource. The RACH resource may also be configured in the (NR-U) measurement configuration to the UE or in the system information (e.g., the SystemInformationBlockType1) broadcast by the serving cell. In some implementations, the RACH resource for the 2-step RA procedure may be configured on a UE basis, on a measurement configuration (associated with the measID) basis, on a report configuration basis, or on a measurement object basis.

Figure 7:
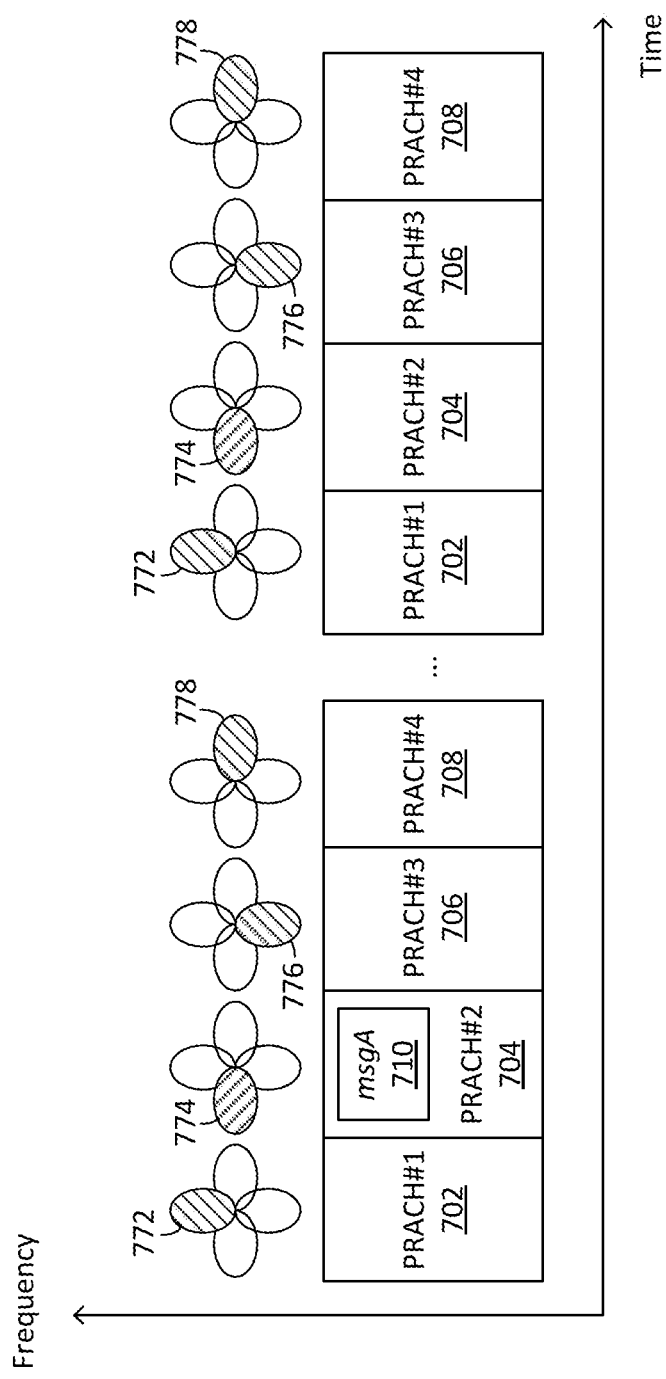
FIG. 7 is a diagram illustrating a procedure of msgA transmission according to the beam operation, in accordance with an implementation of the present disclosure.

FIG. 7 is a diagram illustrating a procedure of msgA transmission according to the beam operation, in accordance with an implementation of the present disclosure. As shown in FIG. 7, the PRACH#1 702, the PRACH#2 704, the PRACH#3 706 and the PRACH#4 708 may appear periodically in the time domain and each PRACH may be configured on one corresponding beam direction to the gNB. For example, the PRACH#1 702 may correspond to the beam direction 772, the PRACH#2 704 may correspond to the beam direction 774, the PRACH#3 706 may correspond to the beam direction 776, and the PRACH#4 708 may correspond to the beam direction 778.

In some implementations, the UE may select one PRACH (e.g., among the PRACH#1 702, the PRACH#2 704, the PRACH#3 706 and the PRACH#4 708) to transmit the msgA 710 based on the DL/UL beam correspondence and the Downlink-Synchronization Signal Block (DL-SSB) monitoring condition. In some other implementations, the UE may transmit the msgA 710 on more than one configured PRACH (e.g., the msgA 710 may transmitted on the PRACHs #1~#4 702~708) if the DL/UL correspondence does not exist. In some implementations, the UE may transmit more than one msgA 710 in one PRACH. In some implementations, the independent PRACH (resources) associated with each beam direction (which may be regarded as a Transmission Configuration Indicator (TCI)-state) may be further configured in each sub-channel. The UE may determine the PRACH resource based on the selected sub-channel for the msgA transmission.

4. Configuration of Cross-Cell Report and Target Cell Indication

In some implementations, the UE may only be configured with several cells for the early measurement report through the 2-step RA procedure (or 4-step RA procedure). Moreover, there may be an association between the measured (NR-U) cell and the serving cell of the 2-step RA procedure (such that the message format in the msgA, such as a cell index, may be further optimized to fulfill the msgA size limitation).

Figure 8:
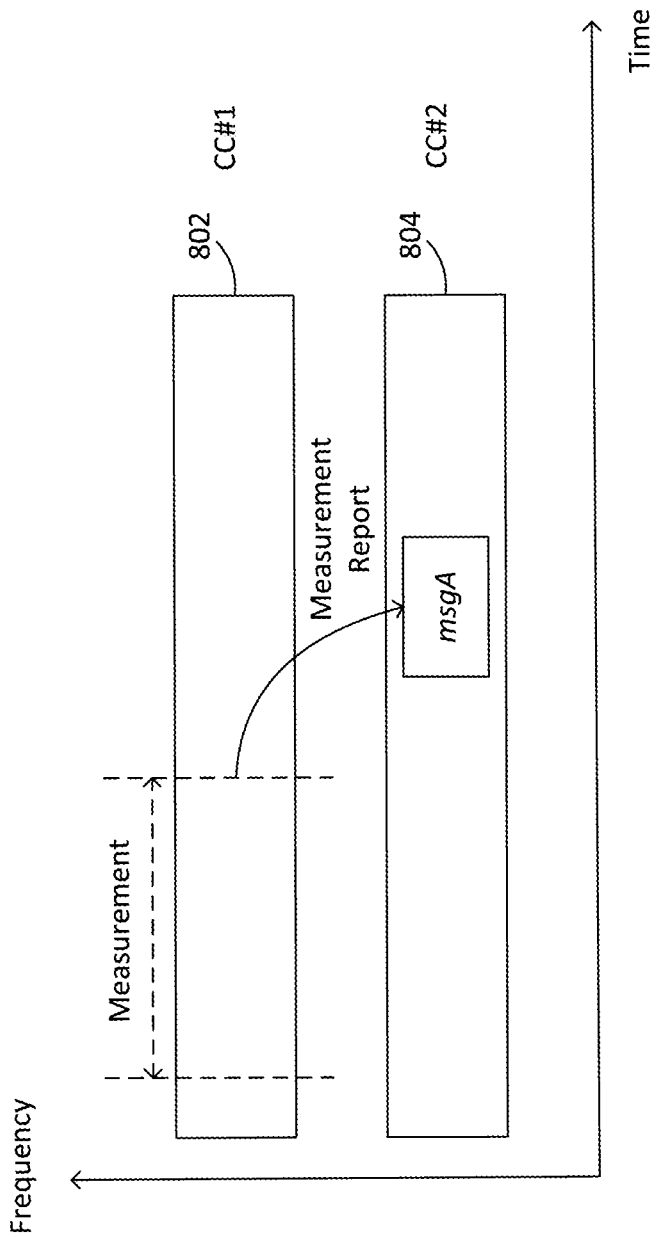
FIG. 8 is a diagram illustrating a cross-cell reporting procedure performed by a UE, in accordance with an implementation of the present disclosure.

FIG. 8 is a diagram illustrating a cross-cell reporting procedure performed by a UE, in accordance with the present disclosure. The UE may indicate the (NR-U) measurement of one or more than one specific carrier (e.g., an NR-U carrier) via a cross-cell report. As shown in FIG. 8, the UE may utilize the measurement configuration from the serving cell to perform an NR-U measurement (e.g., based on the received NR-U measurement configuration) on the NR-U CC#1 802. In the NR-U measurement configuration, the serving cell may further indicate the associated cell for the NR-U measurement report via the 2-step RA procedure (or 4-step RA procedure).

Also referring to Table 5, the serving cell may configure one or more than one target Component Carrier (CC) (e.g., NR-U CC#1 and NR-U CC#3) to be associated with the serving cell (e.g., by delivering the target CC list in system information or RRCRelease message for the early measurement configuration). Moreover, for each target component carrier, the UE may further indicate the Subcarrier Spacing (e.g., 15 KHz, 30 KHz, 60 KHz, 120 KHz) associated with the target CC in the early measurement configuration. After receiving the target cell list, the UE may apply early measurement on these configured target CCs based on the indicated subcarrier spacing. In some additional implementations, for one provided target CC, the serving cell may further indicate one or more than one target cell for the early measurement (e.g., the associated serving cell may also deliver the Physical Cell Identity (PCI) of these associated target cell(s) in the system information or RRCRelease message for the early measurement configuration). After receiving the target cell list, the UE may informed that the target cell list would be applicable to the early measurement report (so, the UE may measure and store the DL measurement results of these indicated target cells). The CC of the serving cell may also be included implicitly as one of the target CCs in the early measurement. One target cell list associated with the CC which is also the operating component carrier of the serving cell may also be provided by the serving cell (e.g., through broadcasting system information or RRCRelease message). The UE may measure and the store the DL-measurement results associated with the provided target cell list (and the serving cell). For early measurement report, the UE may also initiate the 2-step RA procedure (or 4-step RA procedure) with one selected cell, which may be the original serving cell or one selected cell from the received target cells, for the early measurement report. However, it is also worthy to note, to one target component carrier, the UE may not be limited to measure only the cells provided in the target cell list associated with the target component carrier. Moreover, the UE may not be limited to only transmit early measurement report to the cells provided in the target cell list associated with the target component carrier. In some implementations, the serving cell, which provides the measurement configuration to the UE (e.g., through the RRCRelease message or through the broadcasting system information), may also be implicitly included as one of the target cell for measurement. Moreover, in some implementations, the serving frequency carrier, which is the operating frequency carrier of the serving cell, may also be implicitly included as one of the target component carrier for measurement.

In some implementations, the PRACH resource of each associated cell may be provided in the (NR-U) measurement report configuration. In some implementations, the 2-step RA procedure may only be allowed on the SpCell (e.g., a PCell or a PSCell). For example, as shown in FIG. 8, the NR-U CC#2 804 may be the SpCell to the UE. However, it may also possible that the loading of serving SpCell(s) may be high and the serving cell may configure the PRACH resource on the SCell(s) for the UE to provide the NR-U measurement report.

TABLE 5

| (NR-U) measurement configuration for cross-cell Report | | | |
|---|---|---|---|
| Target CC | Target Cell ID (e.g., PCI) | Associated Cell for cross-cell report (e.g,. the serving cell) | Note |
| NR-U CC #1<br>NR-U CC #3 | T_CID #1<br>T_CID #2 | NR-U CID #3<br>NR-U CID #3 | 1) One or more than one target cell may be linked with the same associated cell.<br>2) One or more than one target CC may also be linked with the same associated cell. |

In some implementations, because a UE may report the (NR-U) measurement results on the associated cell, the UE may need to further indicate the target cell ID (e.g., the T_CID#1 or the T_CID#2 shown in Table 5) of the corresponding (NR-U) measurement report. However, the size of the T_CID may be smaller than the maximum number of the aggregated cells indicated in the 3GPP Technical Specification (e.g., TS 38.331 v15.0.0). For example, the maximum number of the aggregated cells may be 32 but the size of the T_CID may be 3 bits if less than 8 NR-U cells are associated with the UE. Thus, the size of the msgA may be smaller. In some of the applications, the serving cell may operate on (NR/E-UTRA) licensed bands or (NR/E-UTRA) unlicensed bands and then the target component carriers may locate on (NR/E-UTRA) licensed bands or (NR/E-UTRA) unlicensed bands. In some additional applications, the serving cell may be an E-UTRAN cell and the target component carriers may locate on NR licensed/un-licensed bands (so, the associated target cells may be NR cells or NR-U cells). In some other applications, the serving cell may be an NR cell and the target component carriers may locate on LTE licensed/un-licensed bands (so, the associated target cells may be E-UTRAN cells or LAA cells).

5. SCell/BWP Management

In some implementations, the methods may be further extended to the SCells of different states. As shown in Table 6, there are several states (e.g., the activated (cell) state, the deactivated (cell) state, and the (cell) dormant state) of a configured SCell. In some implementations, the UE may still apply the measurement without being impacted by the state transitions between each two of the (cell) states (or between each two of a subset of the indicated (cell) states) based on the measurement configuration from the serving cell. The serving cell may have more flexibility to consider the scheduling via the activated cell(s), the deactivated cell(s), and the dormant cell(s) of a UE. Moreover, in some implementations, the UE may transmit the corresponding measurement report via the 2-step RA procedure (or the 4-step RA procedure) on an activated cell, a deactivated cell, or a dormant cell.

TABLE 6

| SCell State | UE behavior | Proposals |
|---|---|---|
| Activated | UE need to monitor PDCCH and measurements. | (1) In this disclosure, gNB may configure a UE to perform (NR-U) measurement on Activated cell, Deactivated cell, or Dormant Cell as the reference of serving cell scheduling on NR-U carriers.<br>(2) Moreover, the 2-step/4-step RA procedure (for NR-U measurement report is also applicable to an activated cell, a Deactivated cell, or a dormant cell). |
| Deactivated | UE may not do neither PDCCH monitoring nor measurements | |
| Dormant | An intermediate state between SCell activation and deactivation, where UE skips PDCCH monitoring on the SCell and does not expect to be scheduled on the SCell. It may still perform measurements on the SCell so that transition to activation state can be very quick. | |

In some implementations, each BWP in one (NR-U) cell may be configured in the activated state/the deactivated state/the dormant state to one UE. In some implementations, the proposed (NR-U) measurement configuration/report (e.g., implemented through the 2-step or 4-step RA procedure) may be also applicable to BWPs of different sub-states (e.g., including the activated state, the deactivated state and the dormant state).

6. msgB Signaling

Figure 9:
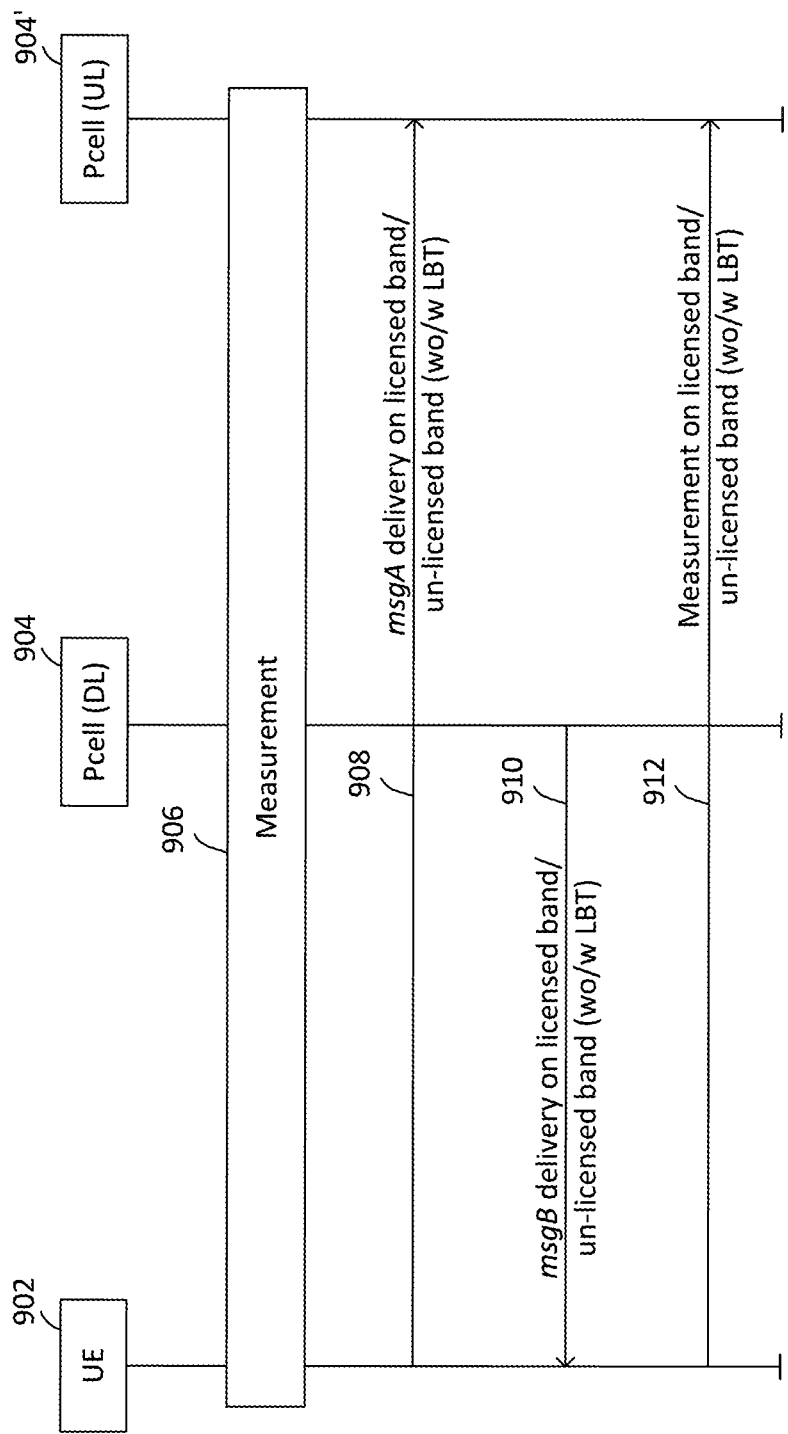
FIG. 9 illustrates a signaling flow between a UE and a Primary Cell (PCell), in accordance with an implementation of the present disclosure.

FIG. 9 illustrates a signaling flow between a UE and a PCell, in accordance with an implementation of the present disclosure. As shown in FIG. 9, in action 908, the UE 902 may perform the measurement (e.g., the NR-U measurement and/or NR measurement). In action 910, the UE 902 may transmit the msgA to the PCell (UL) 904' on the licensed band without implementing the LBT protocol. In action 912, after receiving the msgA from the UE 902, the serving cell (e.g., the PCell (DL) 904) may reply the msgB to the UE 902 based on the 2-step RA procedure in the NR-U unlicensed band. For example, the PCell (DL) 904 may perform the LBT procedure for the msgB delivery). In some implementations, the PCell (DL) 904 and the PCell (UL) 904' may be paired in the Frequency Division Duplex (FDD) scenario. For example, a standalone NR cell is in the unlicensed band in the DL direction while the UL operation is operated in the licensed band. The UE 902 may transmit the msgA on the PCell (UL) 904' without implementing the LBT protocols. The serving cell (e.g., the PCell (DL) 904) may need to apply the LBT protocols for the msgB transmission. In some implementations, the UL grant in the msgB also may be located on the licensed band. In action 912, the UE 902 may transmit the measurement report to the PCell (UL) 904' without LBT. Examples of the msgB design are provided in Table 7.

TABLE 7

| | Contents |
|---|---|
| MSG B Format | |
| General Description | In some implementations, the msgB may comprise:<br>(1) Random Access Response message (RAR message); and<br>(2) Dedicated (control) message (e.g., Radio Resource Control Message or MAC Control Element) (payload_msgB, which may be transmitted on PDSCH). |

TABLE 7-continued

Contents

A. Random Access Response message
the serving cell may provide the following messages in response to the msgA:
(1) SuccessRAR message: ACK message to indicate to the UE that the serving cell has received the msgA (which contains the NR-U measurement or Early measurement indication) successfully.
(2) Fallback message: NACK message to indicate to the UE that the serving cell does not receive the msgA (which contains the NR-U measurement or Early measurement indication) successfully. The serving cell may request the UE to fallback to the 4-step RA procedure to re-transmit the msgA.
(3) Backoff indication: The serving cell may request the UE to re-transmit msgA after a certain time span. The time span may be indicated by the serving cell in the backoff indication. In some other conditions, the time span may be chosen by the UE autonomously within a pre-defined range.
In some implementations,
(a) one explicit IE 'RAR Type' may be configured in msgB. The RAR Type may include {SuccessRAR, FallbackRAR, BackoffRAR}.
(b) The RAR type may be configured in the PDCCH (e.g., Downlink Control Information, DCI) to the UE or the PDSCH (e.g., MAC subheader (e.g., indicated by the logical channel ID in the MAC sub-header) or in the MAC SubPDU (e.g., one specific 'RAR Type' in the MAC subPDU)).
In some other implementations, there may be no explicit RAR Type IE in msgB. The UE may identify msgB type implicitly by identifying the format of msgB.
B. Dedicated (control) message
In some implementations, the serving cell may reply with RRC signaling based on the msgA. For example,
  a. RRCSetup message (New Radio protocols) may be provided in the msgB (e.g. if the UE transmits RRCSetupRequest message in msgA).
  b. RRCResume message may be provided in msgB (e.g., if the UE transmits RRCResumeRequest message in msgA).
  c. RRCRelease message may be provided in msgB (e.g., for the serving cell to re-direct an RRC Inactive UE to other target frequency(s) or Cell(s)).
  d. RRCConnectionRe-establishment message may be provided (e.g. for the serving cell to instruct an RRC Inactive UE to re-establish RRC Connection)
  e. RRCReconfiguration message (e.g., for the serving cell to configure radio resource, such as: DL-SPS (semi-persistent scheduling) configuration, UL configured grant configuration/activation/de-activation, DL/UL (first) bandwidth part configurations, SCell add/removal, on radio resource control on unlicensed bands/licensed bands. In one implementation, the serving cell may provide the re-configuration based on the indicated NR-U measurement report (and/or NR measurement report) in msgA (if there is any).
Some configurations may also be provided in the msgB. For example, to an RRC Connected UE, the msgB may further include the following messages:
1. NR-U SCell activation/de-activation message through the MAC Control Element attached in the msgB.
2. NR-U configured uplink grant activation/de-activation message through the DCI in the msgB reception. (in this condition, the UE may need to reply with configured uplink grant confirmation in one MAC CE transmitted to the serving cell)
3. Duplication activation/de-activation message through the MAC Control Element attached in the msgB.
In some implementations, the RRC messages to the corresponding UE may be multiplexed in the common control channel (CCCH). In some implementations, the RRC messages may be multiplexed in a dedicated control channel.
UE identifier:
Note: UE ID is also included in the msgB for UE to decode msgB successfully. The UE ID may be included in the following ways:
(1) RA-RNTI (e.g., the UE may decode RAR message by applying RA-RNTI, which is associated with the selected preamble and PRACH occasion in msgA).
(2) C-RNTI (e.g., the UE may decode the dedicated (control) signaling by applying C-RNTI in the corresponding Cell group wherein the RA procedure is triggered).
(3) Temporary C-RNTI (e.g., the UE may decode the dedicated (control) signaling by applying temporary C-RNTI in the corresponding Cell group wherein the RA procedure is triggered). .

| | |
|---|---|
| RAR message | |
| SuccessRAR | SuccessRAR may include (any combination of) the following information Elements:<br>a. Contention resolution ID<br>b. (Temporary) C-RNTI<br>c. TA command<br>d. UL grant (e.g., for Early measurement report or UL data transmission).<br>The UL grant may be absent in the SuccessRAR message.<br>e. In some implementations, Early measurement request indication (e.g., 1 bit) may be indicated explicitly in the SuccessRAR. After receiving the indication, the UE may transmit the Early measurement report to the serving cell on the received UL grant. There may be no explicit indicator for the Early measurement enquiry. The UE may be informed that it must provide the Early measurement report automatically after obtaining the UL grant in the SuccessRAR message. |

TABLE 7-continued

| | Contents |
|---|---|
| FallbackRAR | The serving cell may trigger the fallback mechanism to let the UE to re-transmit the msgA. FallbackRAR may include (any combination of) the following information Elements.<br>a. RAPID<br>b. UL grant (to retransmit the msgA payload, which contains the NR-U measurement report in this disclosure).<br>c. TC-RNTI (Temporary C-RNTI) or C-RNTI.<br>d. TA command |
| Backoff indication | (1) The serving cell may provide a Backoff indicator in the RAR message (e.g., BI field in the MAC subPDU).<br>(2) After receiving the Backoff indicator, the UE may set a backoff parameter (e.g., PREAMBLE BACKOFF) to value of the BI field of the MAC subPDU.<br>(3) The UE may select a random backoff time according to a uniform distribution between 0 and the PREAMBLE BACKOFF. |

Figure 10:
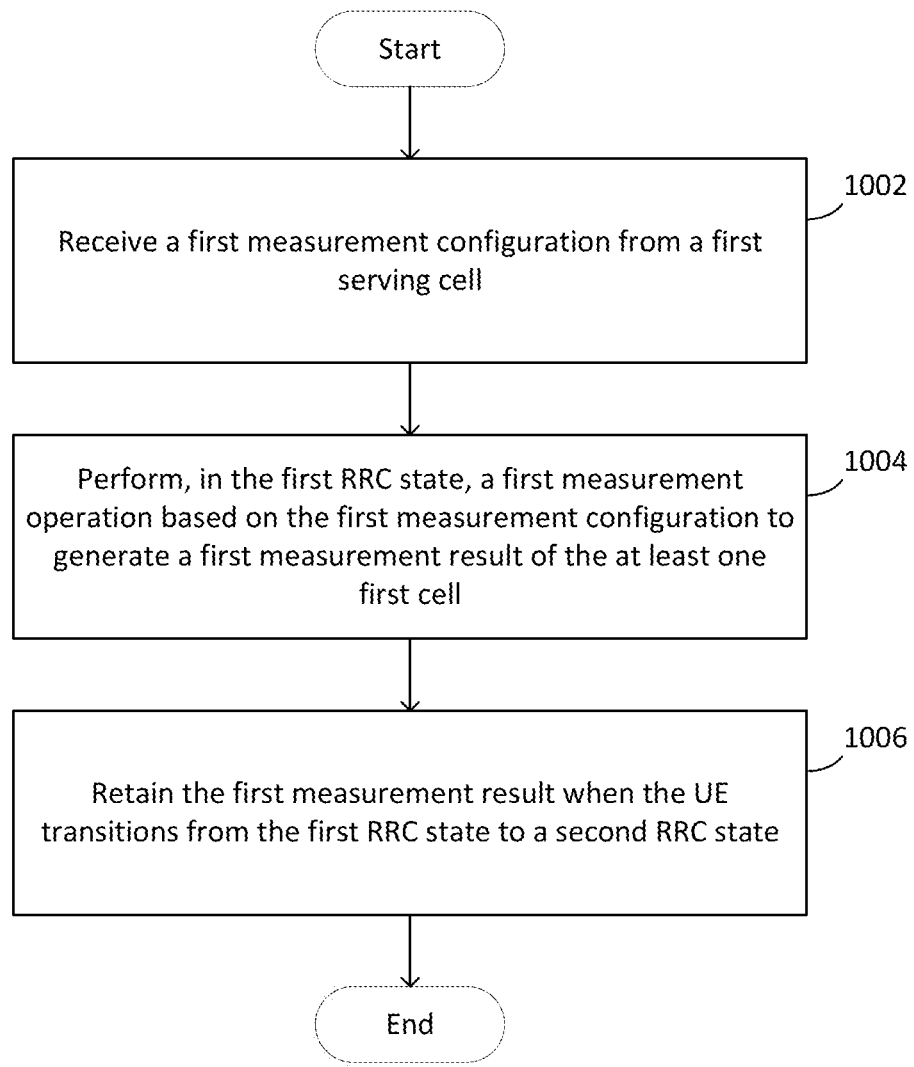
FIG. 10 illustrates a flowchart of a procedure performed by a UE, in accordance with an implementation of the present disclosure.

FIG. 10 illustrates a flowchart of a procedure 1000 performed by a UE, in accordance with an implementation of the present disclosure. Although actions 1002, 1004 and 1006 are delineated as separate actions represented as independent blocks in FIG. 10, these separately delineated actions should not be construed as necessarily order dependent. The order in which the actions are performed in FIG. 10 is not intended to be construed as a limitation, and any number of the described blocks may be combined in any order to implement the procedure 1000, or an alternate method. Moreover, one or more of the actions 1002, 1004 and 1006 may be omitted in some of the present implementations.

In action 1002, a UE may receive a first measurement configuration (e.g., in the system information) from a first serving cell. The first measurement configuration may indicate at least one first cell applicable for being measured by the UE in a first RRC state (e.g., an RRC idle state or an RRC inactive state). The first cell(s) may be considered as the cell(s) applicable for being measured by the UE during the early measurement. For example, during the early measurement, the UE may determine which cell to measure based on the first measurement configuration, and measure the metric of the signal quality of the indicated first cell(s) (if it can be detected) to obtain the corresponding measurement result. In some implementations, the first cell(s) may include the first serving cell and/or other cell(s) configured in the first measurement configuration.

In some implementations, the first measurement configuration may further indicate a first carrier frequency to which the at least one first cell belongs. In some implementations, the first measurement configuration may further indicate one or more than one second carrier frequency for the early measurement. In some implementations, one or more cell IDs (e.g., PCI(s)) of the target cell(s) associated with the first carrier frequency or second carrier frequency for measurement may also be included in the first measurement configuration. In some implementations, the first measurement configuration may further indicate a subcarrier spacing associated with the at least one first cell operating on the first carrier frequency.

In action 1004, the UE may perform, in the first RRC state (e.g., in an RRC idle state or an RRC inactive state), a first measurement operation (e.g., early measurement) based on the first measurement configuration to generate a first measurement result of the at least one first cell.

In action 1006, the UE may retain the first measurement result when the UE transitions from the first RRC state to a second RRC state. For example, once the UE obtains the first measurement result in the first RRC state, the UE may not drop/cancel/release the first measurement result when the UE transitions from the first RRC state to the second RRC state (e.g., an RRC idle state, an RRC inactive state, or an RRC connected state, which is different from the first RRC state). In other words, the UE may perform the RRC transition (e.g., switching from the first RRC state to the second RRC state) without dropping/canceling/releasing the first measurement result, so after the RRC transition, the UE may still keep the first measurement result. In some implementations, the first RRC state may be associated with a first Radio Access Technology (RAT) and the second RRC state may be associated with a second RAT. The first RAT and the second RAT may be the same as or different from each other. For example, one of the first RAT and the second RAT may be NR, and the other of the first RAT and the second RAT may be LTE.

Figure 11:
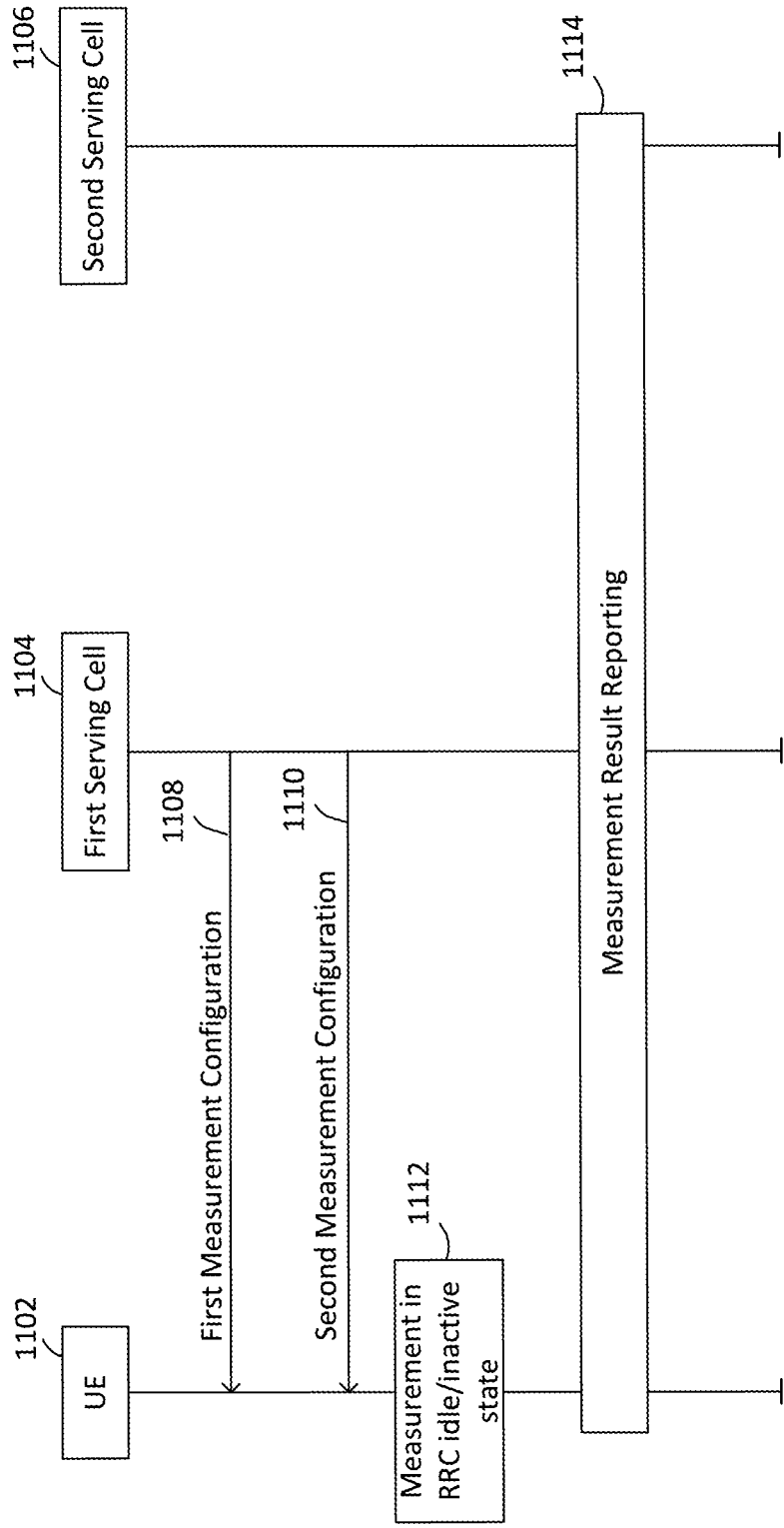
FIG. 11 illustrates a signaling flow among a UE and multiple serving cells, in accordance with an implementation of the present disclosure.

FIG. 11 illustrates a signaling flow among a UE and multiple serving cells, in accordance with an implementation of the present disclosure.

As shown in FIG. 11, in action 1108, a UE 1102 may receive a first measurement configuration from a first serving cell 1104 (e.g., via RRC signaling). The first measurement configuration may indicate at least one first cell applicable for being measured by the UE in a first RRC state (e.g., an RRC idle state or an RRC inactive state) and optionally a first carrier frequency to which the at least one first cell belongs.

In action 1110, the UE 1102 may receive a second measurement configuration in the system information from the first serving cell 1104 (e.g., via RRC signaling). The second measurement configuration may indicate at least one second cell applicable for being measured by the UE in the first RRC state and optionally a second carrier frequency to which the at least one second cell belongs. The second cell(s) may be considered as the cell(s) applicable for being measured by the UE during the early measurement.

In some implementations, the at least one first cell may be associated with a first RAT and the at least one second cell may be associated with a second RAT. For example, the first cell may be associated with the NR (or LTE) and the second cell may be associated with LTE (or NR).

In some implementations, in action 1112, the UE 1102 may further perform, in the first RRC state (e.g., an RRC idle state or an RRC inactive state), a second measurement operation (e.g., the early measurement) based on the second measurement configuration to generate a second measurement result of the at least one second cell.

In some implementations, compared to the first measurement result obtained based on the first measurement configuration, the first measurement result may be associated with the first RAT and the second measurement result may be associated with the second RAT. For example, the first measurement result may be associated with the NR (or LTE/E-UTRA) and the second measurement result may be associated with LTE (or NR).

In action 1114, the UE 1102 may transmit a measurement report including the first measurement result and/or second measurement result. The UE 1102 may transmit the measurement report to the first serving cell 1104 only, the second serving cell 1106 only, or both the first serving cell 1104 and the second serving cell 1106. In some implementations, the first serving cell 1104 may be associated with the first RAT (e.g., NR or E-UTRA) and the second serving cell may be associated with the second RAT (e.g., E-UTRA or NR).

Figure 12:
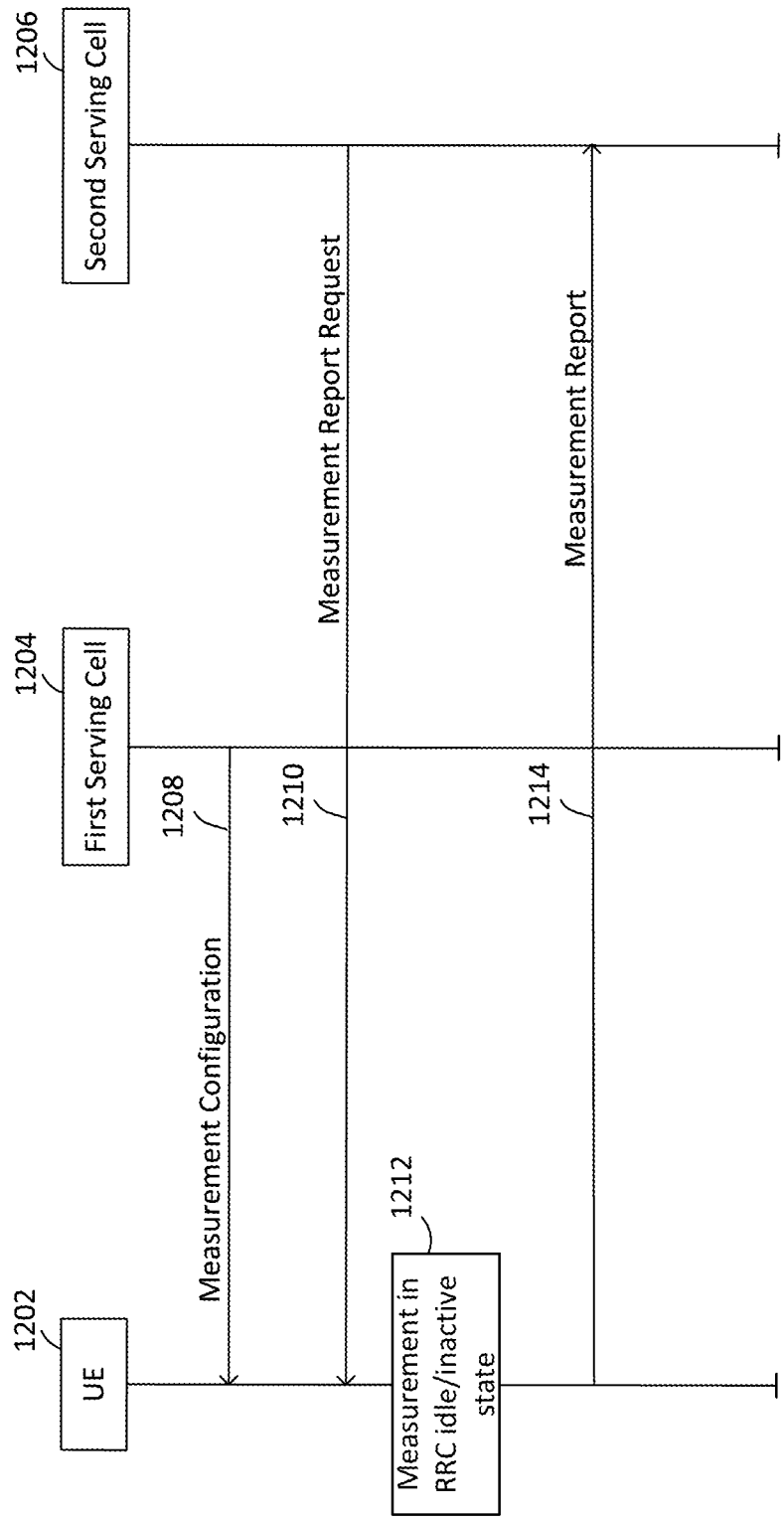
FIG. 12 illustrates a signaling flow among a UE and multiple serving cells, in accordance with an implementation of the present disclosure.

FIG. 12 illustrates a signaling flow among a UE and multiple serving cells, in accordance with an implementation of the present disclosure.

As shown in FIG. 12, in action 1208, a UE 1202 may receive a first measurement configuration from a first serving cell 1204 (e.g., via RRC signaling). The first measurement configuration may indicate at least one first cell applicable for being measured by the UE in a first RRC state (e.g., an RRC idle state or an RRC inactive state) and optionally a first carrier frequency to which the at least one first cell belongs.

In action 1210, the UE 1202 may receive a measurement report request from a second serving cell 1206. In some implementations, the first serving cell 1204 may be associated with a first RAT and the second serving cell 1206 may be associated with a second RAT. For example, the first serving cell 1204 may be associated with NR (or LTE) and the second serving cell 1206 may be associated with LTE (or NR). In some implementations, the measurement report request may be further associated with a third RAT, which may be either NR or E-UTRA. In some implementations, the third RAT may be different from the first RAT or second RAT. In addition, different RAT parameters may be configured in the early measurement configuration for measurement and report, where each RAT parameter may be specific to (or directed to) a particular type of RAT (e.g., NR or E-UTRA or NR-U). The UE may determine whether and how to apply an early measurement configuration to a particular RAT based on whether the early measurement configuration is configured with one (or more than one) RAT parameter directed to the particular RAT.

In some implementations, the measurement report request may be included in an RRC resume message. The UE 1202 may receive the RRC resume message in an RAR message during a 2-step RA procedure or a 4-step RA procedure. In a 2-step RA procedure, the messages may be identified as msgA (e.g., an RA preamble and a payload) and msgB (e.g., an RAR); in a 4-step RA procedure, the messages may be identified as msg1 (e.g., an RA preamble), msg2 (e.g., an RAR message), msg3 (e.g., a Radio Resource Control (RRC) connection/resume request) and msg4 (e.g., an RRC contention setup/RRC connection Resume message or contention resolution message). The RRC resume message including the measurement report request may be included in the msgB of the 2-step RA procedure or included in the msg4 of the 4-step RA procedure.

In some other implementations, the measurement report request may be included in an RRC setup message. The UE 1202 may receive the RRC setup message in an RAR message during a 2-step RA procedure or a msg4 in a 4-step RA procedure. For example, the RRC setup message including the measurement report request may be included in the msgB of the 2-step RA procedure or included in the msg4 of the 4-step RA procedure.

In action 1212, the UE 1202 may perform the (early) measurement in the RRC inactive state or the RRC idle state and generate a first measurement result accordingly.

In action 1214, the UE 1202 may transmit, in response to receiving the measurement report request, the first measurement result to the second serving cell 1206.

In some implementations, the first measurement result may be included in an RRC resume complete message if the corresponding measurement report request is transmitted via an RRC resume message. In some other implementations, the first measurement result may be included in an RRC setup complete message if the corresponding measurement report request is transmitted via an RRC setup message.

According to various implementations of the present disclosure, a UE may transmit the NR-U measurement report (or request a UL grant for the NR-U measurement report) via the 2-step RA procedure. A serving cell may provide control signaling or indication in the msgB (which is the response to the msgA transmitted by the UE) in the 2-step RA procedure. In addition, the serving cell may configure and request an early measurement report on the 2-step RA for the NR-U measurement reporting. The method(s)/procedure(s) described herein are not limited by NR-U and it may also be applicable to other scenarios.

Figure 13:
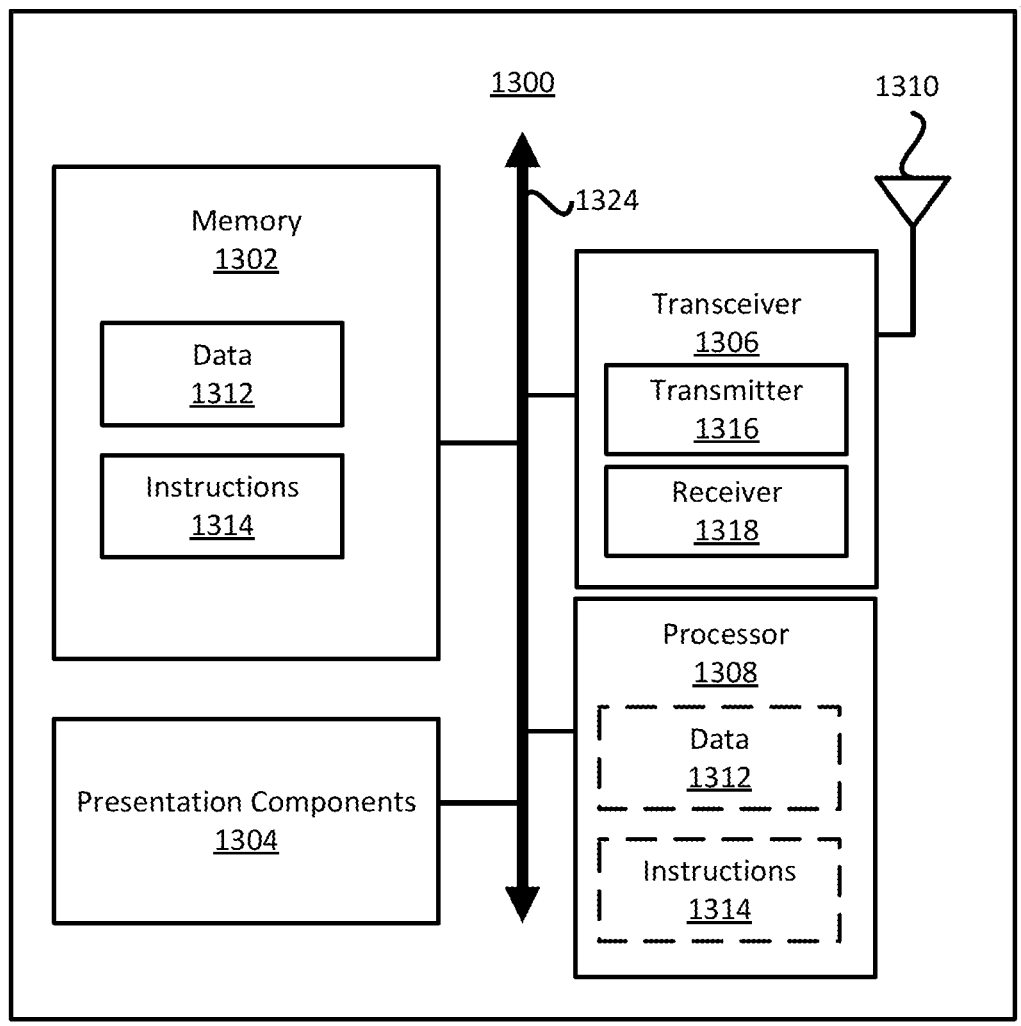
FIG. 13 illustrates a block diagram of a node for wireless communication, in accordance with various aspects of the present disclosure.

FIG. 13 illustrates a block diagram of a node 1300 for wireless communication, in accordance with various aspects of the present disclosure. As shown in FIG. 13, a node 1300 may include a transceiver 1306, a processor 1308, a memory 1302, one or more presentation components 1304, and at least one antenna 1310. The node 1300 may also include an RF spectrum band module, a BS communications module, a network communications module, and a system communications management module, Input/Output (I/O) ports, I/O components, and power supply (not explicitly shown in FIG. 13). Each of these components may be in communication with each other, directly or indirectly, over one or more buses 1324. In one implementation, the node 1300 may be a UE or a BS that performs various functions described herein, for example, with reference to FIGS. 1 through 12.

The transceiver 1306 having a transmitter 1316 (e.g., transmitting/transmission circuitry) and a receiver 1318 (e.g., receiving/reception circuitry) may be configured to transmit and/or receive time and/or frequency resource partitioning information. In some implementations, the transceiver 1306 may be configured to transmit in different types of subframes and slots including, but not limited to, usable, non-usable and flexibly usable subframes and slot formats. The transceiver 1306 may be configured to receive data and control channels.

The node 1300 may include a variety of computer-readable media. Computer-readable media can be any available media that can be accessed by the node 1300 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, Radio Frequency (RF), infrared and other wireless media. Combinations of any of the above should also be included within the scope of computer-readable media.

The memory 1302 may include computer-storage media in the form of volatile and/or non-volatile memory. The memory 1302 may be removable, non-removable, or a combination thereof. For example, the memory 1302 may include solid-state memory, hard drives, optical-disc drives, etc. As illustrated in FIG. 13, the memory 1302 may store computer-readable and/or -executable instructions 1314 (e.g., software codes) that are configured to, when executed, cause the processor 1308 to perform various functions described herein, for example, with reference to FIGS. 1 through 12. Alternatively, the instructions 1314 may not be directly executable by the processor 1308 but may be configured to cause the node 1300 (e.g., when compiled and executed) to perform various functions described herein.

The processor 1308 (e.g., having processing circuitry) may include an intelligent hardware device, a Central Processing Unit (CPU), a microcontroller, an ASIC, etc. The processor 1308 may include memory. The processor 1308 may process the data 1312 and the instructions 1314 received from the memory 1302, and information received through the transceiver 1306, the base band communications module, and/or the network communications module. The processor 1308 may also process information to be sent to the transceiver 1306 for transmission through the antenna 1310, to the network communications module for transmission to a core network.

One or more presentation components 1304 may present data indications to a person or other device. Examples of presentation components 1304 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE) for handling measurement operations in a wireless communication system, the method comprising:
    receiving a first measurement configuration in system information from a first serving cell, the first measurement configuration indicating at least one first cell applicable for being measured by the UE in a first Radio Resource Control (RRC) state which is an RRC idle state or an RRC inactive state;
    performing, in the first RRC state, a first measurement operation based on the first measurement configuration to generate a first measurement result of the at least one first cell;
    generating the first measurement result after performing the first measurement operation;
    receiving a measurement report request in an RRC resume message from a second serving cell;
    retaining the first measurement result after the UE transitions from the first RRC state to a second RRC state which is an RRC connected state; and
    transmitting, in response to receiving the measurement report request, the first measurement result to the second serving cell in an RRC resume complete message.

2. The method of claim 1, wherein the first measurement configuration further indicates a first carrier frequency to which the at least one first cell belongs.

3. The method of claim 2, wherein the first measurement configuration further indicates a subcarrier spacing associated with the first carrier frequency.

4. The method of claim 2, further comprising:
    receiving a second measurement configuration in the system information from the first serving cell, the second measurement configuration indicating at least one second cell applicable for being measured by the UE in the first RRC state and a second carrier frequency to which the at least one second cell belongs.

5. The method of claim 4, wherein the at least one first cell is associated with a first Radio Access Technology (RAT) and the at least one second cell is associated with a second RAT.

6. The method of claim 4, further comprising:
    performing, in the first RRC state, a second measurement operation based on the second measurement configuration to generate a second measurement result of the at least one second cell, the first measurement result being associated with a first RAT and the second measurement result being associated with a second RAT.

7. The method of claim 1, wherein the first serving cell is associated with a first RAT and the second serving cell is associated with a second RAT.

8. The method of claim 1, further comprising:
    receiving the RRC resume message in a Random Access Response (RAR) message during a 2-step Random Access (RA) procedure.

9. The method of claim 1, further comprising:
    receiving the RRC resume message during a 4-step Random Access (RA) procedure.

10. The method of claim 1, further comprising:
    receiving another measurement report request in an RRC setup message from the second serving cell; and
    transmitting, in response to receiving the other measurement report request, the first measurement result to the second serving cell in an RRC setup complete message.

11. The method of claim 10, wherein the first serving cell is associated with a first RAT and the second serving cell is associated with a second RAT.

12. The method of claim 10, further comprising:
    receiving the RRC setup message in an RAR message during a 2-step Random Access (RA) procedure.

13. The method of claim 10, further comprising:
    receiving the RRC setup message during a 4-step RA procedure.

14. The method of claim 1, wherein the first RRC state is associated with a first RAT and the second RRC state is associated with a second RAT.

15. A User Equipment (UE) for handling measurement operations in a wireless communication system, the UE comprising:
 a memory; and
 at least one processor coupled to the memory, the at least one processor being configured to:
 receive a first measurement configuration in system information from a first serving cell, the first measurement configuration indicating at least one first cell applicable for being measured by the UE in a first Radio Resource Control (RRC) state which is an RRC idle state or an RRC inactive state;
 perform, in the first RRC state, a first measurement operation based on the first measurement configuration to generate a first measurement result of the at least one first cell;
 generate the first measurement result after performing the first measurement operation;
 receive a measurement report request in an RRC resume message from a second serving cell;
 retain the first measurement result after the UE transitions from the first RRC state to a second RRC state which is an RRC connected state; and
 transmit, in response to receiving the measurement report request, the first measurement result to the second serving cell in an RRC resume complete message.

16. The UE of claim 15, wherein the first measurement configuration further indicates a first carrier frequency to which the at least one first cell belongs.

17. The UE of claim 16, wherein the first measurement configuration further indicates a subcarrier spacing associated with the first carrier frequency.

18. The UE of claim 16, wherein the at least one processor is further configured to:
 receive a second measurement configuration in the system information from the first serving cell, the second measurement configuration indicating at least one second cell applicable for being measured by the UE in the first RRC state and a second carrier frequency to which the at least one second cell belongs.

19. The UE of claim 18, wherein the at least one first cell is associated with a first Radio Access Technology (RAT) and the at least one second cell is associated with a second RAT.

20. The UE of claim 18, wherein the at least one processor is further configured to:
 perform, in the first RRC state, a second measurement operation based on the second measurement configuration to generate a second measurement result of the at least one second cell, the first measurement result being associated with a first RAT and the second measurement result being associated with a second RAT.

21. The UE of claim 15, wherein the first serving cell is associated with a first RAT and the second serving cell is associated with a second RAT.

22. The UE of claim 15, wherein the at least one processor is further configured to:
 receive the RRC resume message in a Random Access Response (RAR) message during a 2-step Random Access (RA) procedure.

23. The UE of claim 15, wherein the at least one processor is further configured to:
 receive the RRC resume message during a 4-step Random Access (RA) procedure.

24. The UE of claim 15, wherein the at least one processor is further configured to:
 receive another measurement report request in an RRC setup message from the second serving cell; and
 transmit, in response to receiving the other measurement report request, the first measurement result to the second serving cell in an RRC setup complete message.

25. The UE of claim 24, wherein the first serving cell is associated with a first RAT and the second serving cell is associated with a second RAT.

26. The UE of claim 24, wherein the at least one processor is further configured to:
 receive the RRC setup message in an RAR message during a 2-step RA procedure.

27. The UE of claim 24, wherein the at least one processor is further configured to:
 receive the RRC setup message during a 4-step RA procedure.

28. The UE of claim 15, wherein the first RRC state is associated with a first RAT and the second RRC state is associated with a second RAT.

* * * * *